US012683827B2

(12) United States Patent
Ries

(10) Patent No.: US 12,683,827 B2
(45) Date of Patent: Jul. 14, 2026

(54) SYSTEM TO MONITOR FOR AND ALERT ON RISK OF HEAT STRESS IN SCHOOL CLASSROOMS

(71) Applicant: Intrado Life & Safety, Inc., Longmont, CO (US)

(72) Inventor: Brian E. Ries, Minneapolis, MN (US)

(73) Assignee: Intrado Life & Safety, Inc., Longmont, CO (US)

( * ) Notice: Subject to any disclaimer, the term of this patent is extended or adjusted under 35 U.S.C. 154(b) by 308 days.

(21) Appl. No.: 18/379,074

(22) Filed: Oct. 11, 2023

(65) Prior Publication Data

US 2025/0125986 A1 Apr. 17, 2025

(51) Int. Cl.
*H04L 12/18* (2006.01)
*F24F 11/52* (2018.01)
(52) U.S. Cl.
CPC .......... *H04L 12/1895* (2013.01); *F24F 11/52* (2018.01)
(58) Field of Classification Search
CPC .............................. H04L 15/1895; F24F 11/52
USPC ....................................................... 455/404.1
See application file for complete search history.

(56) References Cited

U.S. PATENT DOCUMENTS

| | | | | |
|---|---|---|---|---|
| 8,694,331 B2* | 4/2014 | DeBelser | .............. | G06Q 10/10 |
| | | | | 705/2 |
| 2009/0099862 A1* | 4/2009 | Fireman | ................. | G16H 20/00 |
| | | | | 705/2 |
| 2018/0019889 A1* | 1/2018 | Burns | ................. | H04L 12/4625 |
| 2018/0108246 A1* | 4/2018 | Garg | .................... | G08B 25/009 |
| 2018/0183744 A1* | 6/2018 | Yu | ....................... | H04L 12/1845 |
| 2022/0051542 A1* | 2/2022 | Alvarez | ............ | G08B 21/0283 |
| 2023/0045013 A1* | 2/2023 | Ruiters | ............... | G06Q 50/205 |
| 2023/0379683 A1* | 11/2023 | Roberts | .................. | H04W 4/70 |
| 2023/0394125 A1* | 12/2023 | Hirata | ................. | G06V 40/171 |
| 2024/0135361 A1* | 4/2024 | Natale | ................. | G06Q 20/325 |

* cited by examiner

*Primary Examiner* — Maria El-Zoobi
(74) *Attorney, Agent, or Firm* — PATENT CAPITAL GROUP

(57) ABSTRACT

A method includes receiving a first personal registration indicating a first responsibility position of a first person, the first personal registration further indicating a first device ID; receiving a first trigger signal including first heat data identifying a first heat index; determining that the first heat index exceeds a first predetermined threshold; determining the first device ID, at least in part based on the first responsibility position; and performing a first notification, at least in part based on the first device ID.

17 Claims, 10 Drawing Sheets

| USER NAME | RESPONSIBILITY POSITION | USER LOCATION | USER DEVICE ID | HEAT SUSCEPTIBILITY |
|---|---|---|---|---|

FIG. 3A

| USER NAME | RESPONSIBILITY POSITION | USER LOCATION | USER DEVICE ID | HEAT SUSCEPTIBILITY |
|---|---|---|---|---|
| ADMINISTRATOR | TEACHER | MEDICAL CONTACT | PARENT CONTACT | |

FIG. 3B

| THRESHOLD | SCHOOL PERSONNEL | LOCATION | INDIVIDUALS | EXTERNAL NOTIFICATIONS |
|---|---|---|---|---|
| 1 | GENERAL LOCATION | GENERAL LOCATION | NONE | NONE |
| 2 | GENERAL | SPECIFIC | NONE | NONE |
| | SPECIFIC | SPECIFIC | | |
| | SPECIFIC | GENERAL | | |
| 3 | ALL | GENERAL LOCATION | SPECIFIC INDIVIDUALS | DISTRICT ADMINISTRATORS, PARENTS |
| 4 | ALL | GENERAL LOCATION | NONE | DISTRICT ADMINISTRATORS, PARENTS |

FIG. 4

S505 — START

S510 — RECEIVE STRUCTURAL REGISTRATION

S515 — RECEIVE PERSON REGISTRATION

S520 — RECEIVE TRIGGER SIGNAL

S525 — DETERMINE HEAT INDEX

S530 — HEAT INDEX < 1ST THRESHOLD? — YES

NO

S535 — LEVEL 1 NOTIFICATIONS

HEAT INDEX < 2ND THRESHOLD? — YES

S540 — NO

S545 — LEVEL 2 NOTIFICATIONS

S550 — HEAT INDEX < 3RD THRESHOLD? — YES

NO

S555 — LEVEL 3 NOTIFICATIONS

HEAT INDEX < 4TH THRESHOLD? — YES

S560 — NO

S565 — LEVEL 4 NOTIFICATIONS

S570 — END

500

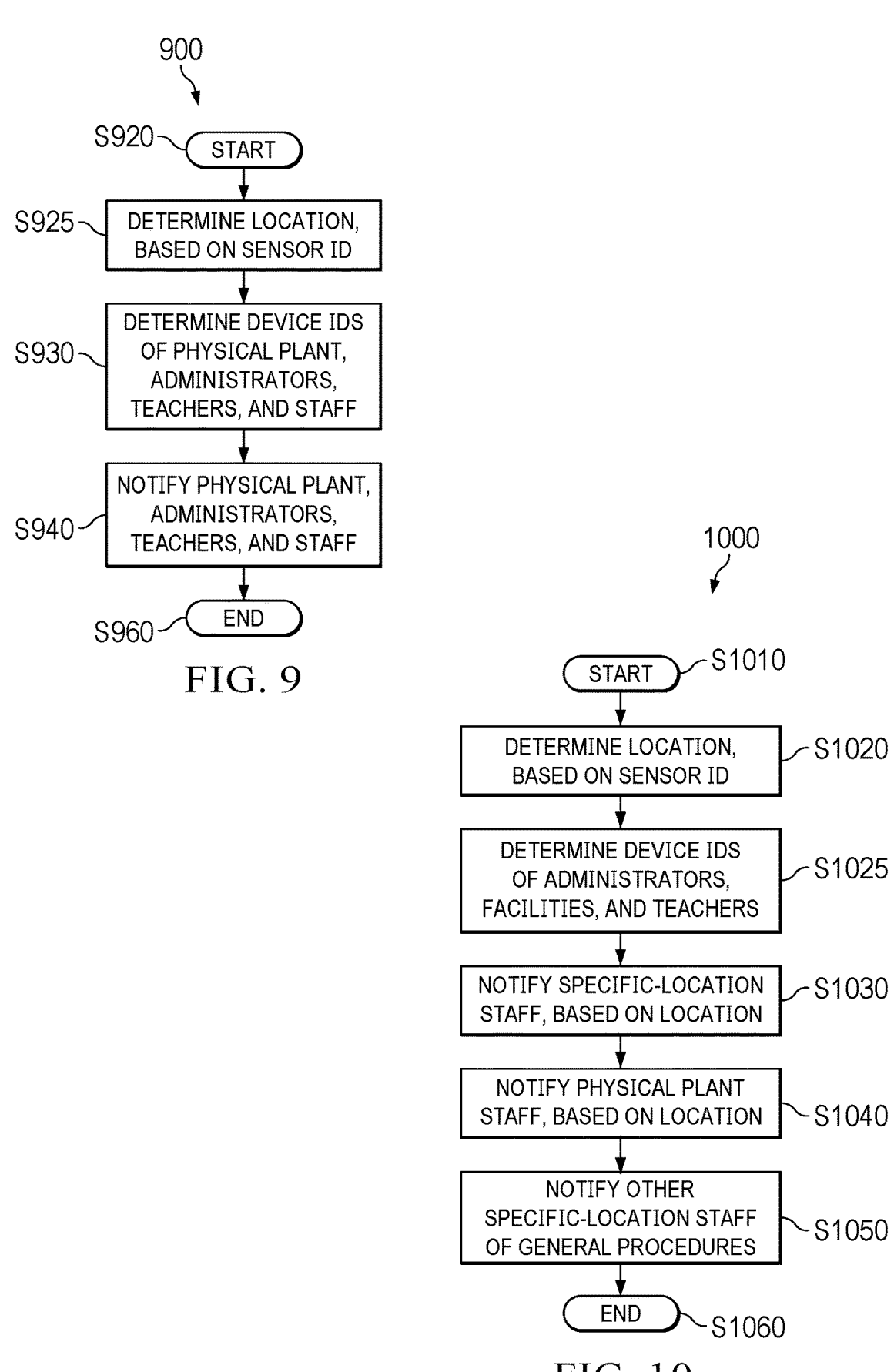

900

S920 — START

S925 — DETERMINE LOCATION, BASED ON SENSOR ID

S930 — DETERMINE DEVICE IDS OF PHYSICAL PLANT, ADMINISTRATORS, TEACHERS, AND STAFF

S940 — NOTIFY PHYSICAL PLANT, ADMINISTRATORS, TEACHERS, AND STAFF

S960 — END

START — S1010

DETERMINE LOCATION, BASED ON SENSOR ID — S1020

DETERMINE DEVICE IDS OF ADMINISTRATORS, FACILITIES, AND TEACHERS — S1025

NOTIFY SPECIFIC-LOCATION STAFF, BASED ON LOCATION — S1030

NOTIFY PHYSICAL PLANT STAFF, BASED ON LOCATION — S1040

NOTIFY OTHER SPECIFIC-LOCATION STAFF OF GENERAL PROCEDURES — S1050

END — S1060

S1220 — START

S1230 — DETERMINE DEVICE IDS OF ADMINISTRATORS, DISTRICT ADMINISTRATORS, TEACHERS, AND PARENTS

S1240 — NOTIFY ADMINISTRATORS, DISTRICT ADMINISTRATORS, TEACHERS, AND PARENTS

S1260 — END

1300

1310 — NETWORK INTERFACE

1340 — PROCESSOR

1320 — USER INPUT INTERFACE

1350 — USER OUTPUT INTERFACE

1355

1330 — MEMORY

1335 — PROGRAM

SYSTEM TO MONITOR FOR AND ALERT ON RISK OF HEAT STRESS IN SCHOOL CLASSROOMS

BACKGROUND

Technical Field

This disclosure relates to a system including sensors and, in particular, to a system to monitor heat stress and to produce an alert based thereon.

Related Art

Currently, some buildings employ heating, ventilation, and air conditioning (HVAC) systems to address uncomfortable weather.

Heat makes it harder for students to learn. Students perform worse on tests when they are hot, according to studies by economists R. Jisung Park and Joshua Goodman.

Meanwhile, climate change is forcing schools to close early for heat days. Some school districts have no air conditioning and no money to install it. Therefore, some such districts are sending students home earlier in the year.

Very few districts have mandated temperature maximums.

BRIEF SUMMARY

In a first implementation of the present disclosure, a method includes receiving a first personal registration indicating a first responsibility position of a first person, the first personal registration further indicating a first device ID; receiving a first trigger signal including first heat data identifying a first heat index; determining that the first heat index exceeds a first predetermined threshold; determining the first device ID, at least in part based on the first responsibility position; and performing a first notification, at least in part based on the first device ID.

A second implementation is the first implementation, further comprising: receiving a structural registration identifying a location and a first sensor ID; and determining the location, at least in part based on the first sensor ID, wherein the first sensor ID is indicated by the first trigger signal, the first personal registration indicates the location, and the first notification indicates the location.

A third implementation is the second implementation, wherein the first device ID is determined at least in part based on the location.

A fourth implementation is any of the first through third implementations, further comprising: receiving a second personal registration indicating a user name and a heat susceptibility; and determining the user name, at least in part based on the heat susceptibility, wherein the first notification indicates the user name.

A fifth implementation is the fourth implementation, further comprising: determining a contact, at least in part based on the heat susceptibility, wherein the second personal registration indicates the contact; and performing a second notification to the contact, wherein the second notification indicates the user name.

A sixth implementation is any of the first through fifth implementations, further comprising: receiving a second personal registration indicating a second responsibility position of a second person, the second personal registration further indicating a second device ID, the second responsibility position different from the first responsibility position; receiving a second trigger signal including second heat data identifying a second heat index; determining that the second heat index exceeds a second predetermined threshold greater than the first predetermined threshold; determining the second device ID, at least in part based on the second responsibility position; and performing a third notification, at least in part based on the second device ID.

A seventh implementation is any of the first through sixth implementations, wherein the first heat index is calculated based on $HI=c_1+c_2T+c_3R+c_4TR+c_5T^2+c_6R^2+c_7T^2R+c_8TR^2+c_9T^2R^2$, where HI=Heat Index in degrees Fahrenheit (° F.), R=Relative Humidity in % between 0 and 100, and T=Temperature in degrees Fahrenheit, c1 is substantially equal to −42.4, c2 is substantially equal to 2.05, c3 is substantially equal to 10.1, c4 is substantially equal to −0.225, c5 is substantially equal to $−6.84×10^{-3}$, c6 is substantially equal to $−5.48×10^{-2}$, c7 is substantially equal to $1.23×10^{-3}$, c8 is substantially equal to $8.53×10^{-4}$, and c9 is substantially equal to $−1.99×10^{-6}$.

In an eighth implementation, an apparatus includes a network interface that receives a first personal registration and a first trigger signal, the first trigger signal including first heat data identifying a first heat index, the first personal registration indicating a first responsibility position of a first person and a first device ID; and a processor configured to determine that the first heat index exceeds a first predetermined threshold, the processor further configured to determine the first device ID, at least in part based on the first responsibility position, wherein a first notification is performed, at least in part based on the first device ID.

A ninth implementation is the eighth implementation, wherein the network interface receives a structural registration identifying a location and a first sensor ID, the first sensor ID included in the first trigger signal, the processor further is configured to determine the location, at least in part based on the first sensor ID, the first personal registration indicates the location.

A tenth implementation is the ninth implementation, wherein the processor further is configured to determine the first device ID at least in part based on the location.

An eleventh implementation is any of the eighth through tenth implementations, wherein the network interface receives a second personal registration indicating a user name and a heat susceptibility, the processor further is configured to determine the user name, at least in part based on the heat susceptibility, and the first notification indicates the user name.

A twelfth implementation is the eleventh implementation, wherein the processor further is configured to determine a contact, at least in part based on the heat susceptibility, the second personal registration indicating the contact, and a second notification is performed to the contact, the second notification indicating the user name.

A thirteenth implementation is any of the eighth through twelfth implementations, wherein the network interface receives a second personal registration indicating a second responsibility position of a second person, the second personal registration further indicating a second device ID, the second responsibility position different from the first responsibility position, the network interface further receives a second trigger signal including second heat data identifying a second heat index, the processor further configured to determine that the second heat index exceeds a second predetermined threshold greater than the first predetermined threshold, the processor further configured to determine the second device ID, at least in part based on the second responsibility position, and a third notification is performed, at least in part based on the second device ID.

A fourteenth implementation is any of the eighth through thirteenth implementations, wherein the first heat index is calculated based on $HI=c_1+c_2T+c_3R+c_4TR+c_5T^2+c_6R^2+c_7T^2R+c_8TR^2+c_9T^2R^2$, where HI=Heat Index in degrees Fahrenheit (° F.), R=Relative Humidity in % between 0 and 100, and T=Temperature in degrees Fahrenheit, c1 is substantially equal to −42.4, c2 is substantially equal to 2.05, c3 is substantially equal to 10.1, c4 is substantially equal to −0.225, c5 is substantially equal to −6.84×10$^{-3}$, c6 is substantially equal to −5.48×10$^{-2}$, c7 is substantially equal to 1.23×10$^{-3}$, c8 is substantially equal to 8.53×10$^{-4}$, and c9 is substantially equal to −1.99×10$^{-6}$.

In a fifteenth implementation, a computer-readable medium includes instructions that, when executed by a processor, perform operations comprising: receiving a first personal registration indicating a first responsibility position of a first person, the first personal registration further indicating a first device ID; receiving a first trigger signal including first heat data identifying a first heat index; determining that the first heat index exceeds a first predetermined threshold; determining the first device ID, at least in part based on the first responsibility position; and performing a first notification, at least in part based on the first device ID.

A sixteenth implementation is the fifteenth implementation, the operations further comprising: receiving a structural registration identifying a location and a first sensor ID; and determining the location, at least in part based on the first sensor ID, wherein the first sensor ID is included in the first trigger signal, and the first personal registration indicates the location.

A seventeenth implementation is the sixteenth implementation, wherein the first device ID is determined at least in part based on the location.

An eighteenth implementation is any of the fifteenth through seventeenth implementations, the operations further comprising: receiving a second personal registration indicating a user name and a heat susceptibility; and determining the user name, at least in part based on the heat susceptibility, wherein the first notification indicates the user name.

A nineteenth implementation is the eighteenth implementation, the operations further comprising: determining a contact, at least in part based on the heat susceptibility, wherein the second personal registration indicates the contact; and performing a second notification to the contact, wherein the second notification indicates the user name.

A twentieth implementation is any of the fifteenth through nineteenth implementations, the operations further comprising: receiving a second personal registration indicating a second responsibility position of a second person, the second personal registration further indicating a second device ID, the second responsibility position different from the first responsibility position; receiving a second trigger signal including second heat data identifying a second heat index; determining that the second heat index exceeds a second predetermined threshold greater than the first predetermined threshold; determining the second device ID, at least in part based on the second responsibility position; and performing a third notification, at least in part based on the second device ID.

A twenty-first implementation is any of the fifteenth through twentieth implementations, wherein the first heat index is calculated based on $$HI = c_1 + c_2T + c_3R + c_4TR + c_5T^2 + C_6R^2 + c_7T^2R + c_8TR^2 + c_9T^2R^2,$$

where HI=Heat Index in degrees Fahrenheit (° F.), R=Relative Humidity in % between 0 and 100, and T=Temperature in degrees Fahrenheit, c1 is substantially equal to −42.4, c2 is substantially equal to 2.05, c3 is substantially equal to 10.1, c4 is substantially equal to −0.225, c5 is substantially equal to −6.84×10$^{-3}$, c6 is substantially equal to −5.48×10$^{-2}$, c7 is substantially equal to 1.23×10$^{-3}$, c8 is substantially equal to 8.53×10$^{-4}$, and c9 is substantially equal to −1.99×10$^{-6}$.

In a twenty-second implementation, an apparatus includes reception means for receiving a first personal registration indicating a first responsibility position of a first person and for receiving a first trigger signal including first heat data identifying a first heat index, the first personal registration further indicating a first device ID; and determination means for determining that the first heat index exceeds a first predetermined threshold and for determining the first device ID, at least in part based on the first responsibility position, wherein a first notification is performed, at least in part based on the first device ID.

A twenty-third implementation is the twenty-second implementation, wherein the reception means receives a structural registration identifying a location and a first sensor ID, the determination means determines the location, at least in part based on the first sensor ID, the first sensor ID is indicated by the first trigger signal, the first personal registration indicates the location, and the first notification indicates the location.

A twenty-fourth implementation is the twenty-third implementation, wherein the first device ID is determined at least in part based on the location.

A twenty-fifth implementation is any of the twenty-second through twenty-fourth implementations, wherein the reception means receives a second personal registration indicating a user name and a heat susceptibility, the determination means determines the user name, at least in part based on the heat susceptibility, and the first notification indicates the user name.

A twenty-sixth implementation is the twenty-fifth implementation, wherein the determination means determines a contact, at least in part based on the heat susceptibility, the second personal registration indicates the contact, a second notification is performed to the contact, and the second notification indicates the user name.

A twenty-seventh implementation is any of the twenty-second through twenty-sixth implementations, wherein the reception means receives a second personal registration indicating a second responsibility position of a second person, the second personal registration further indicating a second device ID, the second responsibility position different from the first responsibility position, the reception means receives a second trigger signal including second heat data identifying a second heat index, the determination means determines that the second heat index exceeds a second predetermined threshold greater than the first predetermined threshold and determines the second device ID, at least in part based on the second responsibility position, and a third notification is performed, at least in part based on the second device ID.

A twenty-eighth implementation is any of the twenty-first through twenty-seventh implementations, wherein the first heat index is calculated based on $$HI = c_1 + c_2T + c_3R + c_4TR + c_5T^2 + C_6R^2 + c_7T^2R + c_8TR^2 + c_9T^2R^2,$$

where HI=Heat Index in degrees Fahrenheit (° F.), R=Relative Humidity in % between 0 and 100, and T=Temperature in degrees Fahrenheit, c1 is substantially equal to −42.4, c2 is substantially equal to 2.05, c3 is substantially equal to 10.1, c4 is substantially equal to −0.225, c5 is substantially equal to $-6.84 \times 10^{-3}$, c6 is substantially equal to $-5.48 \times 10^{-2}$, c7 is substantially equal to $1.23 \times 10^{-3}$, c8 is substantially equal to $8.53 \times 10^{-4}$, and c9 is substantially equal to $-1.99 \times 10^{-6}$.

BRIEF DESCRIPTION OF THE SEVERAL VIEWS OF THE DRAWINGS

FIGS. 3A and 3B each illustrate implementations of a personal registration data structure, according to an implementation of the present disclosure.

FIG. 4 illustrates a table for notifying individuals of tasks, according to an implementation of the present disclosure.

FIG. 9 illustrates an algorithm for level 1 notifications, according to an implementation of the present disclosure.

FIG. 10 illustrates an algorithm for level 2 notifications, according to an implementation of the present disclosure.

DETAILED DESCRIPTION

Implementations of the present disclosure can include a system to monitor and notify/alert on the risk of heat stress and heat-related illness in school classrooms or other areas of high-risk, utilizing a heat index value as the basis of monitoring. The system can utilize a sensor in each classroom or location of concern to measure temperature and relative humidity, and then calculate the heat index value.

The sensor utilizes a wireless communications method to provide a trigger signal indicating the heat index value and a sensor ID of the sensor.

The system utilize the sensors as endpoint devices and trigger notifications at specific heat index values in any given classroom or area. The system can use the sensor ID to identify a room or location in the school.

The notifications can be set to trigger at multiple heat index values per individual classroom/location with different notifications and messages (alerts) targeted to specific personnel. In a school implementation, these personnel can include district administrators, principal, school nurse, teachers, staff, and maintenance.

The system can send the notifications through multiple digital channels, such as a mobile application, a desktop software client, an audio phone message, short message service (SMS), email, light-emitting diode (LED) signs, displays, and/or speakers.

The notifications can be sent to Intrado Safety Shield to trigger/assign an incident management response, including hydration, fans, rest break, check on those with health issues, move students out of highest risk areas, and early release.

Figure 1:
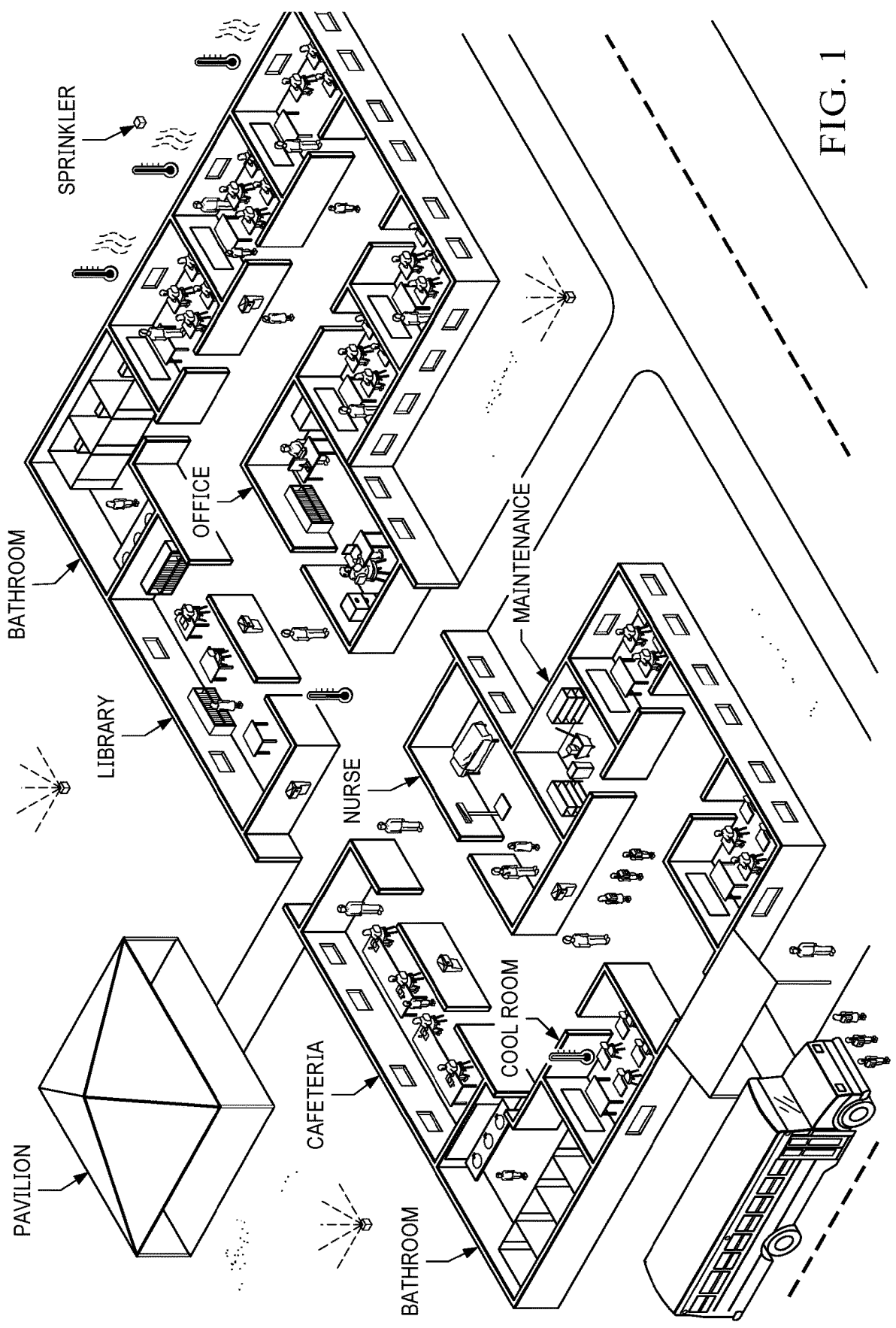
FIG. 1 illustrates an implementation of a building and grounds, according to an implementation of the present disclosure.

FIG. 1 illustrates an implementation of a building and grounds, according to an implementation of the present disclosure. The building of FIG. 1 is a single-floor school, although the applicability of the present disclosure is not limited to a single-floor structure, a school (or other educational) building, or even to a single building. Thus, the building and grounds of FIG. 1 are to be understood merely as being exemplary.

The exterior of the school illustrates a bus, a pavilion (an example of a shaded structure), and sprinklers.

The interior of the school of FIG. 1 includes bathrooms, a cafeteria, a library, an office, a school medical room (e.g., a nurse), and a maintenance room.

Many or all of the rooms illustrated in FIG. 1 include at least one sensor. The sensor(s) can measure the humidity and temperature in the respective location, such that a heat index can be calculated. FIG. 1 simplifies the illustration of these sensors by using thermometers, although it is to be understood that measurement of humidity is part of determining a heat index.

In FIG. 1, the sensors on the right side of the building indicate the heat index is very high. Further, FIG. 1 illustrates that the sprinkler on the right side of the school is off. In some implementations, the system can transmit a task to a device of a custodian to turn on this sprinkler for a short period of time to produce a cooling effect.

In some implementations, the operation of the sprinkler can increase the heat index by adding moisture to the air. Thus, in such an implementation, FIG. 1 would illustrate a result of the system transmitting a task to the device of the custodian to turn off the sprinkler to reduce humidity (and, thus, the heat index).

On the left side of the school, an unoccupied room is designated the "cool room." This room can have prioritized and/or additional cooling, relative to the rest of the school.

Figure 2:
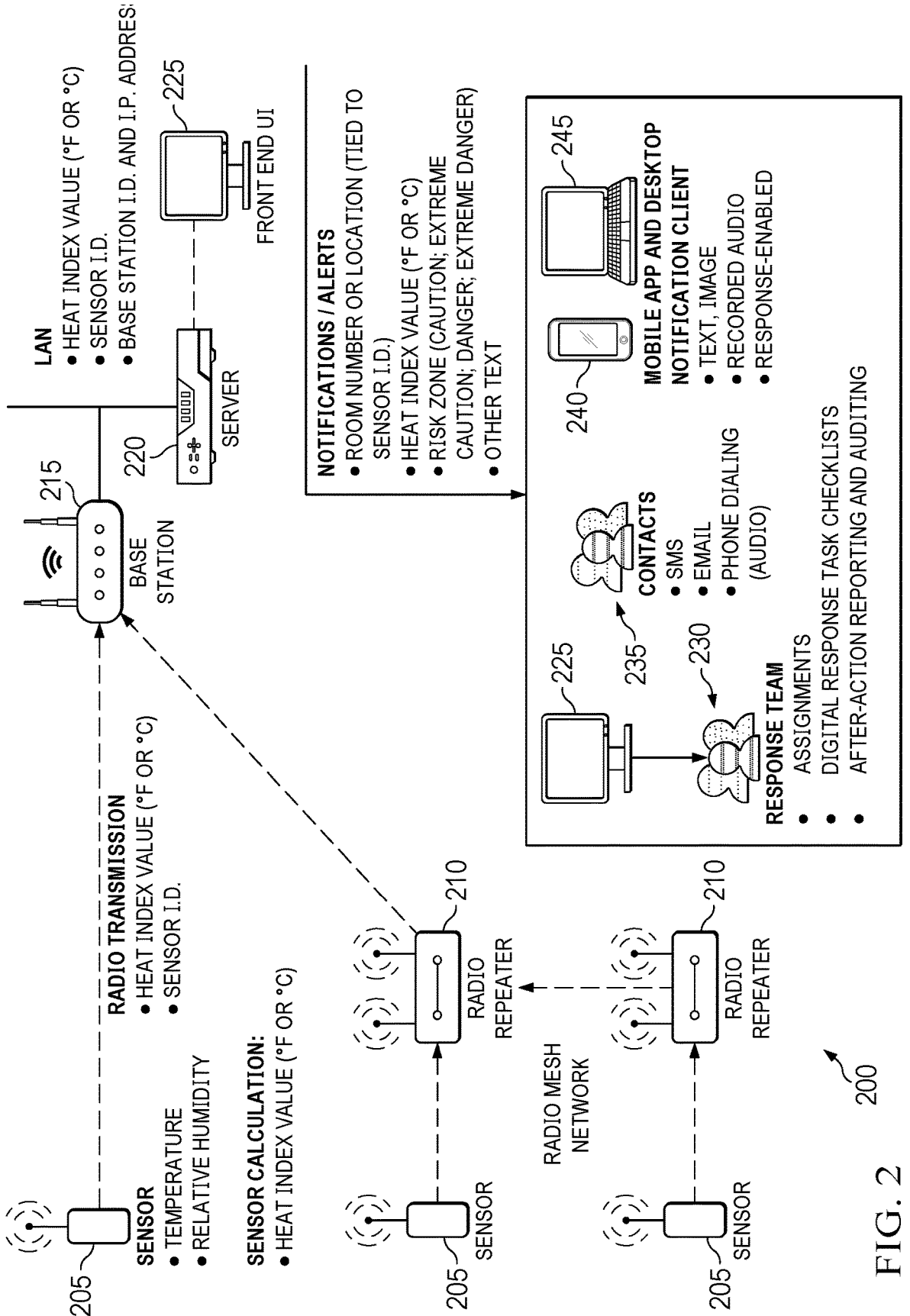
FIG. 2 illustrates an implementation of a system, according to an implementation of the present disclosure.

FIG. 2 illustrates an implementation of a system 200, according to an implementation of the present disclosure. The system 200 includes a plurality of sensors 205, a plurality of radio repeaters 210, a base station 215, a server 220, and a front end UI 225. The system 200 sends notifications and/or alerts (generally referred to as "notifications") to a response team 230, contacts 235, a smartphone 240, and/or a desktop computer 245.

As discussed previously, the sensors 205 can measure temperature and/or relative humidity. In some implementations, the sensor is a heat index sensor (e.g., includes both a thermometer and a hygrometer). In other implementations, the sensor is a discrete thermometer or a discrete hygrometer and is paired in a respective location with the other sensor. In implementations in which the sensor includes both a thermometer and a hygrometer, the sensor can calculate a heat index value (e.g., in Celsius or Fahrenheit).

In some implementations, the sensor can be proprietary. For example, the sensor can sense temperature, where Fahrenheit and Celsius measurements are selectable. The sensor can sense relative humidity and can calculate the heat index value, either in Fahrenheit or Celsius.

The sensor can transmit a trigger signal indicating the heat index value and sensor ID. In some implementations, the sensor transmits the trigger signal periodically (e.g., every 10 minutes). The trigger signal can indicate the heat index value by including the heat index value, by including the temperature and humidity, and/or by including a value indicating that a particular heat index value was exceeded. In many implementations, this particular heat index value is the same as the predetermined thresholds described herein. In several implementations, the heat index value is not necessarily the same as the predetermined thresholds: for example, the transmitted heat index values can be half-steps between the predetermined thresholds.

In many implementations, the sensor includes an internal antenna that transmits radio waves. In various implementations, the sensor can transmit the trigger signal via a Bluetooth Low Energy (BLE) and/or Zigbee mesh network to a local area network (LAN). The LAN can be a cellular gateway or via Intrado Revolution, for example. In some implementations, the sensor can transmit via WiFi, selectable at either 2.4 or 5 GHz. In select implementations, the sensor can transmit on various frequencies, such as 900 MHz in North America or 868 MHz in Europe, the Middle East, and Africa.

The sensor can include connect to an external power supply or include an internal power supply. In a few implementations, the internal power supply can be batteries, whether standard or rechargeable. The rechargeable batteries can be recharged via a docking station and/or Universal Serial Bus (USB) C, for example. In several implementations, the sensor can be turned off (e.g., during the summer or winter break) to conserve power.

The sensor can include a backlit display and/or a non-glare coating. The display can indicate the battery life.

The sensor can be mounted in any manner, such as via a nail or screw, Velcro, or a command strip.

The sensor can include a heat release vent.

The firmware of the sensor can be updated in several implementations. The update can be performed via USB-C, for example.

The sensors can transmit a sensor ID of the respective sensor, along with the temperature and relative humidity and/or heat index value. This transmission can be wired or wireless. In some wireless implementations, the transmission can be received by a radio repeater 210 or a base station 215. The radio repeater 210 can relay the transmission to another radio repeater 210 or to the base station 215.

The base station 215 can relay the transmission to the server 220. This relay can be performed by a local area network (LAN), for example. The relay can include the temperature and relative humidity and/or heat index value and the sensor ID. In some implementations, this relay also includes the base station ID and/or base station IP address. The server 220 can communicate this information to a computer that implements the front end UI 225.

The computer can transmit informational and/or task notifications. These notifications can include a room number or location determined by the computer, based on the sensor ID, for example. In some implementations, this determination is performed by Intrado Revolution. The notifications can include or indicate the heat index value (e.g., in Celsius or Fahrenheit), a descriptive risk zone, and/or other text.

The notifications can describe the risk zone with a label like "caution," "extreme caution," "danger," and/or "extreme danger." The present disclosure sets forth four heat index thresholds: these four labels can correspond to the four heat index thresholds.

The response team 230 can include, for example, administrators, school medical staff, and cafeteria staff. The computer can transmit to electronic devices of the response team 230 an assignment (e.g., a location and/or a time) and/or a digital response task checklist (e.g., by sending a task notification). In some implementations, the computer can receive, from the electronic devices of the response team, after-action reporting and auditing.

The computer can also send notifications to the contacts 235. These contacts 235 can be, for example, the parents and/or guardians of the students of the school. The contacts also can include other emergency contacts of these students, as well as medical providers (e.g., private doctors) for the students. The contacts are not limited to those of students: the computer can send notifications to emergency contacts of staff members, as well, for example. The contacts 235 can be contacted by Short Message Service (SMS), email, or phone dialing (audio).

The computer can also use an application for a smartphone and/or a notification client for a desktop computer. Such a smartphone application is available from Intrado Corporation.

FIGS. 3A and 3B illustrate implementations of a personal registration data structure, according to an implementation of the present disclosure.

In FIG. 3A, the data structure includes five fields: user name, position, user location, user device ID, and heat susceptibility.

The user name field can be a full name (e.g., first, last, and middle names), an alphanumeric identifier, a taxpayer identification number, or any other identification of a person.

The position field can indicate a position of responsibility for the person. For example, the position can be student, parent, teacher, administrator, staff, cafeteria staff, medical staff, safety officer, and so on. The position can be other than a text label: for example, the position can be a number or an alphanumeric code.

The user location field indicates a nominal location for the person. For example, a student's location can be their classroom, homeroom, or designated (e.g., first) period room. Similarly, a teacher's location can be their classroom, homeroom, or designated period room. An administrator's location can be their office. A staff member's location can be the location for which they are responsible (e.g., library or cafeteria). A parent's location can be their home address, for example.

The user device ID field indicates an electronic device associated (e.g., belonging to) the person. In some implementations, the electronic device ID can be a telephone number at which the electronic device can receive calls or text messages. In various implementations, the electronic device ID can be an identifier of an Intrado Wearable 911 Panic Button. In at least one implementation, the electronic device ID is an email address or social media account (e.g., a user name at a domain).

The heat susceptibility field indicates whether the person has a known susceptibility to heat. In many implementations, this field is simply a binary field (e.g., Y/N, 0/1, T/F). In some implementations, the heat susceptibility field can include more detailed information, such as why heat might be an issue for the person (e.g., age, body mass).

Some implementations will modify these fields. For example, the user name field can be broken into first, middle, and last name fields.

Some implementations will include additional fields. For example, some data structures will include multiple user device ID fields, where each field represents an ID for a different communication method or platform through which to contact the person. At least one implementation can include fewer fields, such as omitting the heat susceptibility.

The implementation described the user location field as a static location. Implementations are possible in which the user location field is changed dynamically over the course of a school day, week, or semester. Implementations are also possible in which the data structure includes multiple user location fields, reflecting different times (e.g., first period or 9 am-10 am).

FIG. 3B illustrates an additional or alternative personal registration. This personal registration can be used for a student, for example. This personal registration additionally includes a responsible administrator, a teacher, a medical contact, and a parent (or guardian) contact. Thus, it becomes possible to determine efficiently which administrator and/or teacher (or medical personnel) is responsible for the student, as well as what medical contact and/or parent (or guardian) should be contacted with regard to that student.

FIG. 4 illustrates a table for notifying individuals of tasks, according to an implementation of the present disclosure.

An effective response to excessive heat recognizes different strategies for addressing the extent of the heat. For example, as the heat increases, it is insufficient to simply have students drink more water. Indeed, providing children an excess amount of water can lead to hyponatremia. Thus, different strategies should be invoked, based on heat index thresholds.

Further, heat indices can vary across a building for many reasons, such as exposure to the sun or improper local cooling. Thus, appropriate measures to address the heat at one location might differ from appropriate measures at a different location.

FIG. 4 illustrates four such heat index thresholds. FIG. 4 identifies, for each threshold, relevant school personnel, locations, individuals, and external notifications.

For example, for the first (e.g., lowest) threshold, school personnel belonging to a general location are notified. The location of which the school personnel are informed is also a general location. For this threshold, no specific individuals nor external notifications are sent, for example. Thus, general preparations can be made, and general preparations can be taken without regard to specifically problematic locations.

The notified school personnel can be physical plant (e.g., janitorial, maintenance, and/or custodial) staff. The notification can indicate a task to determine that cooling measures (e.g., air conditioning, fans) are operating properly. The notification can alternatively or additionally indicate a task to open windows of the school at night and/or a task to use or install fans to bring cooler air into the school.

In addition, the system can send an informational notification to administrators, affected teachers, and staff. The affected teachers can be, for example, teachers associated with the location in which the heat index exceeded the first threshold. The text of the informational notification can indicate the exceeded threshold and the location in which the threshold was exceeded.

In one implementation, the first threshold can be, for example, a heat index of 80° F. or 27° C.

In the second (e.g., next lowest) threshold, notifications are received by three groups of school personnel. General staff, administrators, and teachers are notified of tasks relative to specific locations. A subset of those individuals receives tasks relative to a general location. And a further subset of that subset receives tasks relative to a specific location.

For example, general staff can include administrators, teachers, physical plant, and other (e.g., cafeteria, nursing) staff. The system can send notifications to administrators, teachers, cafeteria, and nursing staff that assign tasks that lunch should be under a shaded structure or in a classroom/building, with limited time given for free outdoor play.

The system can send to a subset of the general staff (e.g., teachers) an additional notification relative to a general location. For example, the notification can be to implement an adapted schedule. An example of such an adapted schedule is to move physical education class to the morning and/or cancel afternoon physical education class. Another example of such a notification is to ensure a "cool room" is available. Such a "cool room" can be a room not being used for class. Thus, the room can be used by students and other people showing early signs of heat stress. In addition, the notification can be to encourage students to drink water, prior to boarding buses, and to give students time to drink cool water located near transportation pickup areas.

The system can send to a subset of that subset (e.g., teachers near the location with the heat index exceeding the second threshold) a further notification relative to that location.

For example, in at least one implementation, the system can include a sensor placed outside the school (e.g., mounted to the side of the building). This sensor can sense the outside air temperature and/or humidity. This sensor can transmit values indicating the outside air temperature, humidity, and/or heat index. The system thus can determine the outside air temperature is lower than the inside air temperature, for example. Accordingly, the system can transmit the notification to indicate the windows and doors to the room are to be open and/or to ensure the fan is working to provide a cross-breeze.

Further, in such an implementation, the system can determine the outside air temperature exceeds the inside air temperature. Thus, in this situation, the system can transmit the notification can indicate to close the windows to the room. In addition or alternatively, the notification can indicate to implement more frequent water breaks. As another additional or alternative notification, the notification can indicate to darken rooms to reduce energy expenditure and absorption, e.g., by shutting off overhead lights and closing the blinds on the windows and/or door, if possible.

Further, the system can send an informational notification to administrators, affected teachers, and staff. The affected teachers can be, for example, teachers associated with the location in which the heat index exceeded the second threshold. The text of the informational notification can indicate the exceeded second threshold and the location in which the second threshold was exceeded.

In one implementation, the second threshold can be, for example, a heat index of 90° F. or 32° C.

Turning to the third threshold, notifications can be more specific than for the first and second thresholds. For example, different notifications can be sent to administrators, school medical (e.g., nurse), cafeteria, and non-classroom staff. Notifications also can be sent to specific staff (e.g., teachers) in specific locations (e.g., specific classrooms) and/or in general locations.

For example, notifications can be sent to administrators indicating a task to cancel extra-curricular activities. Notifications to administrators alternatively or additionally can indicate a task of checking on staff with heat susceptibility and/or health conditions. The system can determine these staff, based on the position field and the heat susceptibility field, as illustrated in FIG. 3.

Further, a notification can be sent to school medical staff indicating a task to periodically check on heat-susceptible (or otherwise health-compromised) students. The notification alternatively or additionally can indicate a task of being available in the "cool room," when the staff is available. Further, the notification alternatively or additionally can indicate a task of contacting parents and/or guardians of students with serious health issues and to determine whether attendance at school is considered hazardous.

Further, a notification can be sent to cafeteria and/or physical education staff to indicate a task of distributing water bottles, sports drinks, and/or large, moist towelettes to affected rooms.

In addition, a notification can be sent to non-classroom staff (e.g., safety officer) to indicate a task of roaming duties to watch for signs of heat stress and/or illness.

A notification can be sent to location-specific staff operating outside of the specific location in which the heat index threshold was exceeded. For example, this notification can indicate a task of implementing a second adapted schedule. The second adapted schedule can be canceling physical education class and/or only holding physical education class indoors in an air-conditioned space.

Additionally, a notification can be sent to location-specific staff operating in the specific location in which the heat index threshold was exceeded. For example, the notification can indicate a task of commencing a pre-set rotation of students to cooler areas of the school. The notification alternatively or additionally can indicate a task of minimizing instruction to allow rest periods to students. The notification alternatively or additionally can indicate a task of turning off and/or minimizing the use of electronics, such as computers and smart boards. Further, the notification alternatively or additionally can indicate a task of ensuring frequent water breaks to students and/or escorting students showing signs of heat stress to the "cool room."

Further, the system can send a first informational notification to administrators, affected teachers, and staff. The affected teachers can be, for example, teachers associated with the location in which the heat index exceeded the third threshold. The text of the informational notification can indicate the exceeded third threshold and the location in which the third threshold was exceeded.

In addition, the system can send a second informational notification to district administration and a third informational notification to parents. For example, the system can determine the user device ID for each person with a responsibility position of "district administrator" and then transmit the second informational notification to the associated user device ID. Similarly, the system can determine the user device ID for each person with a responsibility position of "parent" and then transmit the third informational notification to the associated user device ID. The system can generate text of the second informational notification to indicate the name of the school and that the third heat index threshold was exceeded. The system can generate text of the third informational notification to indicate the name of the school and that the third heat index threshold was exceeded. The third informational notification also can indicate that the school might be closed.

In one implementation, the third threshold can be, for example, a heat index of 105° F. or 41° C.

Turning to the fourth threshold, the system can send notifications to administrators. The notifications can indicate a task of canceling school or initiating an early release procedure. The notifications can additionally or alternatively indicate a task of directing provisions for transportation of students who are regularly transported in district buses and other students not residing in the immediate area. Further, the notifications additionally or alternatively can indicate a task of contacting local media to provide for notification and status reports to parents/guardians and the public.

In addition, the system can send a second informational notification to district administration and a third informational notification to parents. The system can generate text of the second informational notification to indicate the name of the school and that the fourth heat index threshold was exceeded. The system can generate text of the third informational notification to indicate the name of the school and that the third heat index threshold was exceeded. The third informational notification also can indicate instructions regarding the closure of the school.

In one implementation, the fourth threshold can be, for example, a heat index of 120° F. or 49° C.

Needless to say, the threshold heat indices are exemplary. Any appropriate heat indices can be used. Further, the system can set fewer or more heat index thresholds. In addition, the system can transmit additional, alternative, or fewer task and/or informational notifications. Further, the tasks and/or information associated with the different thresholds can be modified.

Figure 5:
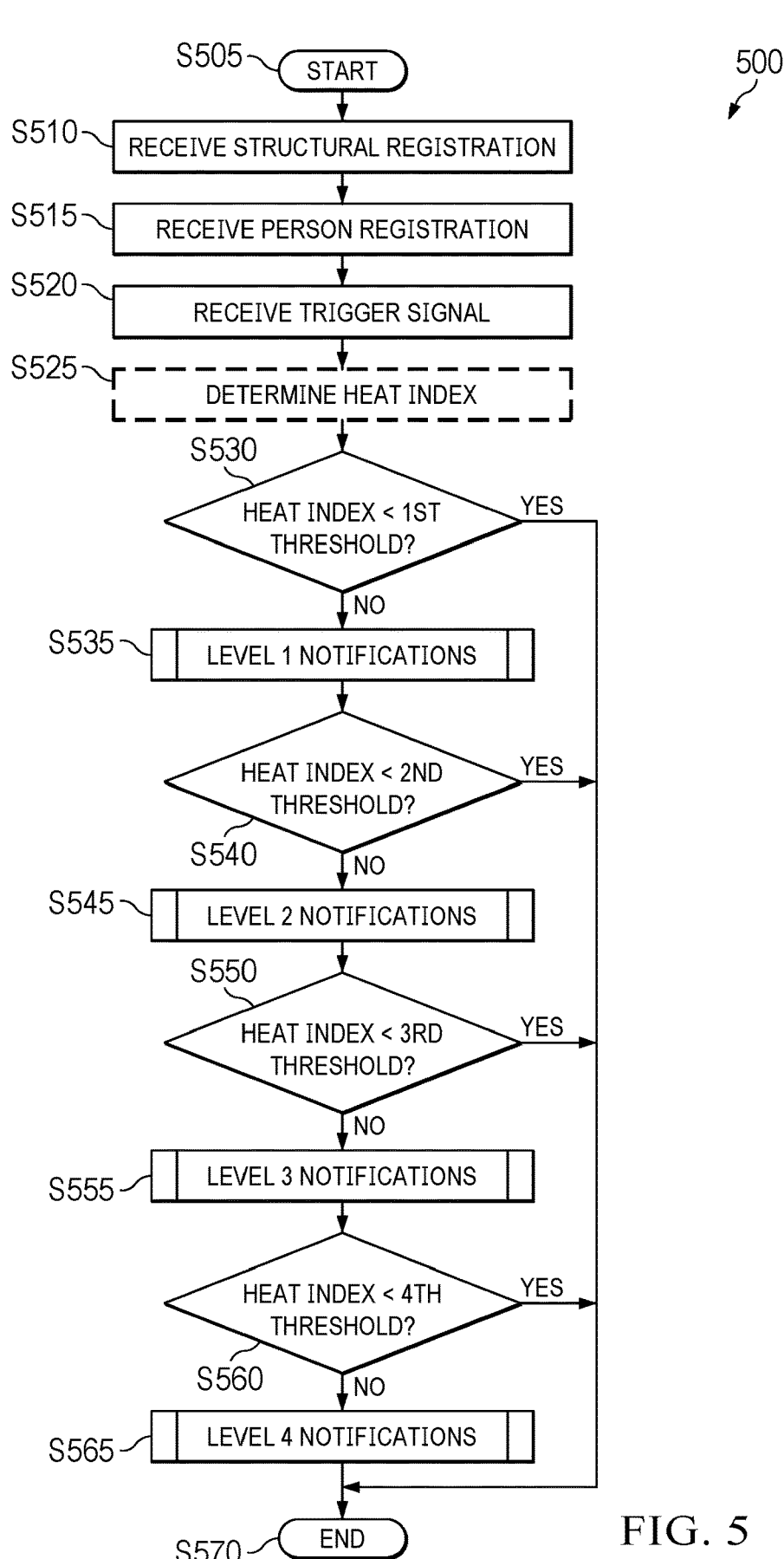
FIG. 5 illustrates a first algorithm for monitoring, for alerting, and responding to a heat risk, according to an implementation of the present disclosure.

FIG. 5 illustrates a first algorithm 500 for monitoring, for alerting, and responding to a heat risk, according to an implementation of the present disclosure. The algorithm 500 begins at S505 and advances to S510.

In S510, the system receives a structural registration including a location and a sensor ID. In the system of FIG. 2, a sensor having the sensor ID monitors (e.g., is installed in) the location. In many implementations, the structural registration takes an agnostic approach to physical structures and/or organizational structures. Thus, the structural registration can concern all or part of a building and even all or parts of more than one building. Similarly, the structural registration can concern all or part of an organization and even all or parts of more than one organization. Although FIG. 5 illustrates S510 as a monolithic operation, the structural registration can occur or be updated over time.

The algorithm 500 then advances to S515.

In S515, the system receives a personal registration of a person. The personal registration can include or otherwise indicate the data structure illustrated in FIG. 3. The algorithm 500 then advances to S520.

In S520, the system receives a trigger signal. The trigger signal includes heat data and a sensor ID.

The heat data identifies a heat index. In some implementations, a sensor measures a temperature and a humidity and transmits the temperature and humidity to the system. In other implementations, a sensor measures the temperature and the humidity, determines the heat index therefrom, and transmits the heat index to the system.

The sensor ID is an identification of the sensor that produced (e.g., measured) the heat data.

The algorithm 500 then advances to optional S525.

In optional S525, the system determines the heat index, if the trigger signal received in S520 did not include the heat index. For example, if the trigger signal indicated the temperature and humidity, the system can determine the heat index.

To calculate the heat index in Fahrenheit, the following formula can be used:

$$HI = c_1 + c_2T + c_3R + c_4TR + c_5T^2 + C_6R^2 + c_7T^2R + c_8TR^2 + c_9T^2R^2$$

In this formula, HI=Heat Index in degrees Fahrenheit (° F.), R=Relative Humidity in % between 0 and 100, and T=Temperature in degrees Fahrenheit, where

| | | |
|---|---|---|
| $c_1 = -42.379$ | $c_2 = 2.04901523$ | $c_3 = 10.14333127$ |
| $c_4 = -0.22475541$ | $c_5 = -6.83783 \times 10^{-3}$ | $c_6 = -5.481717 \times 10^{-2}$ |
| $c_7 = 1.22874 \times 10^{-3}$ | $c_8 = 8.5282 \times 10^{-4}$ | $c_9 = -1.99 \times 10^{-6}$ |

To calculate the heat index in Celsius, the following formula is used:

$$HI = c_1 + c_2T + c_3R + c_4TR + c_5T^2 + C_6R^2 + c_7T^2R + c_8TR^2 + c_9T^2R^2$$

In this formula, HI=Heat Index in degrees Celsius (° C.), R=Relative Humidity in % between 0 and 100, T=Temperature in degrees Celsius (° C.), where

| | | |
|---|---|---|
| $c_1 = -8.78466948$ | $c_2 = 1.61139411$ | $c_3 = 2.33854884$ |
| $c_4 = -0.14611605$ | $c_5 = -1.230809 \times 10^{-2}$ | $c_6 = -1.642483 \times 10^{-2}$ |
| $c_7 = 2.211732 \times 10^{-3}$ | $c_8 = 7.2546 \times 10^{-4}$ | $c_9 = -3.582 \times 10^{-6}$ |

Although these constants are illustrated with precise numerals, many implementations use substantially equal constants, such as within 1% of these values. Further, even a value within 10% of the listed constants can be considered substantially equal.

The algorithm then advances to S530.

In S530, the system determines whether the heat index exceeds (e.g., is not less than) a first predetermined threshold, e.g., 80° F. or 27° C. If the system determines the heat index exceeds the first threshold, the algorithm 500 advances to S535. If the system determines the heat index does not exceed the first threshold, the algorithm 500 advances to S570.

In S535, the system performs level 1 notifications. These notifications are discussed in more detail in connection with FIG. 9. The algorithm 500 then advances to S540.

In S540, the system determines whether the heat index exceeds the second threshold, e.g., 90° F. or 32° C. If the system determines that the heat index exceeds the second threshold, the algorithm 500 advances to S545. If the system determines that the heat index does not exceed the second threshold, the algorithm 500 advances to S570.

In S545, the system performs level 2 notifications. These notifications are discussed in more detail in connection with FIG. 10. The algorithm then advances to S550.

In S555, the system determines whether the heat index exceeds the third threshold, e.g., 105° F. or 41° C. If the system determines that the heat index exceeds the third threshold, the algorithm 500 advances to S555. If the system determines that the heat index does not exceed the third threshold, the algorithm 500 advances to S570.

In S555, the system performs level 3 notifications. These notifications are discussed in more detail in connection with FIG. 11. The algorithm then advances to S560.

In S560, the system determines whether the heat index exceeds the fourth threshold, e.g., 120° F. or 49° C. If the system determines that the heat index exceeds the fourth threshold, the algorithm 500 advances to S565. If the system determines that the heat index does not exceed the fourth threshold, the algorithm 500 advances to S570.

In S565, the system performs level 4 notifications. These notifications are discussed in more detail in connection with FIG. 12. The algorithm then advances to S570.

In S570, the algorithm 500 concludes.

In the algorithm 500, the system progressively compares the heat index against higher thresholds. Accordingly, the system performs the less critical, level 1 notifications first and performs more critical, higher-level notifications later.

Figure 6:
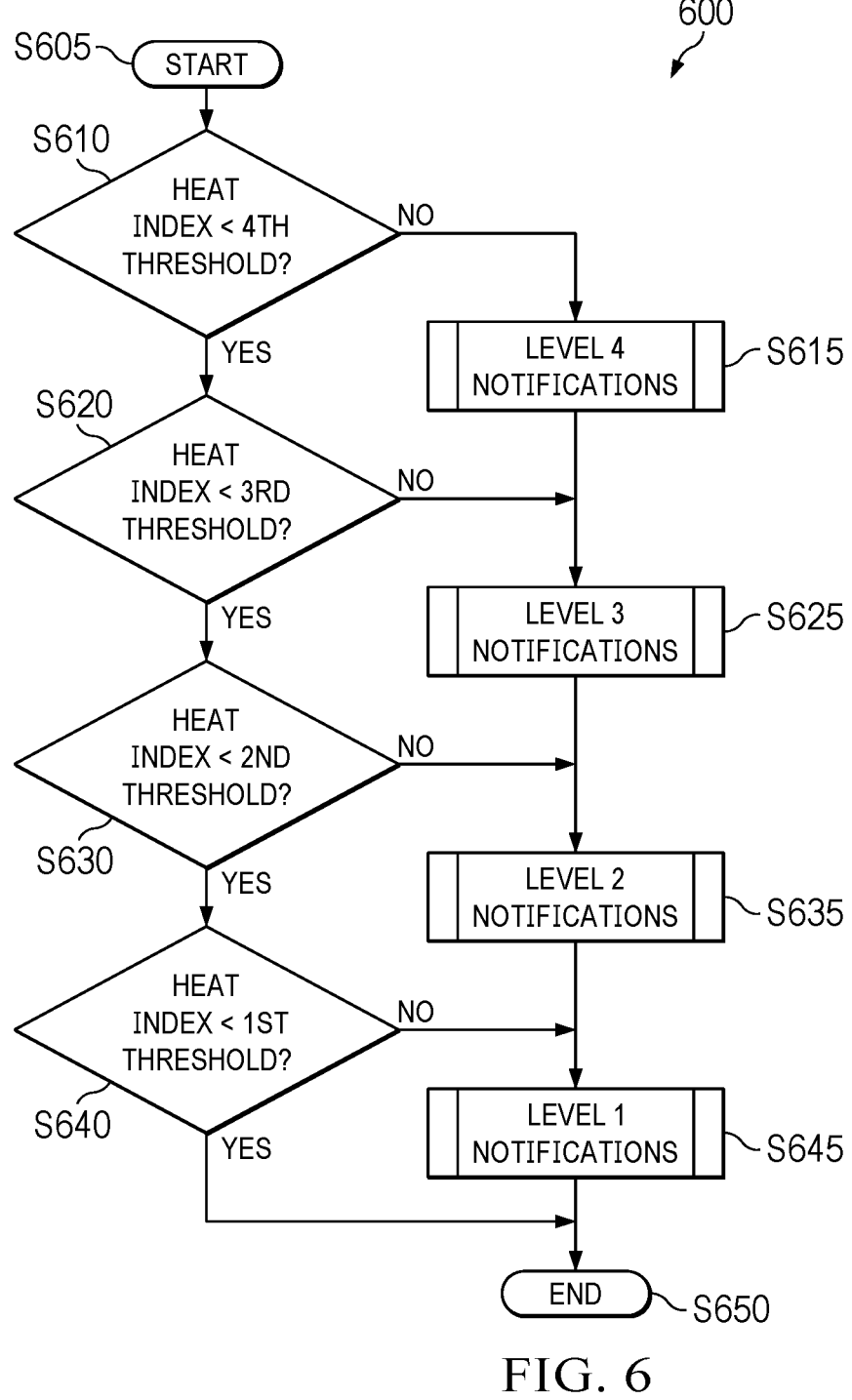
FIG. 6 illustrates a second algorithm for monitoring, for alerting, and responding to a heat risk, according to an implementation of the present disclosure.

FIG. 6 illustrates an algorithm 600 for monitoring, for alerting, and responding to a heat risk, according to an implementation of the present disclosure. The algorithm 600 differs from the algorithm 500 in that the heat index is first compared against the highest threshold. Thus, the system can address the most critical notifications first to avoid delays.

At the beginning of algorithm 600, the system receives a structural registration including a location and a sensor ID, a personal registration, and a trigger signal, as in S510-S520. The system optionally determines the heat index, as in S525, if the trigger signal did not include the heat index.

The algorithm 600 begins at S605 and advances to S610. In S610, the system determines whether the heat index exceeds the fourth threshold. If the heat index exceeds the fourth threshold, then the algorithm 600 advances to S615. If the heat index does not exceed the fourth threshold, then the algorithm 600 advances to S620.

In S615, the system performs level 4 notifications, discussed in connection with FIG. 12. The algorithm 600 then advances to S625.

In S620, the system determines whether the heat index exceeds the third threshold. If the heat index exceeds the third threshold, then the algorithm 600 advances to S625. If the heat index does not exceed the third threshold, then the algorithm 600 advances to S630.

In S625, the system performs level 3 notifications, discussed in connection with FIG. 11. The algorithm 600 then advances to S635.

In S630, the system determines whether the heat index exceeds the second threshold. If the heat index exceeds the second threshold, then the algorithm 600 advances to S635. If the heat index does not exceed the second threshold, then the algorithm 600 advances to S640.

In S635, the system performs level 2 notifications, discussed in connection with FIG. 10. The algorithm 600 then advances to S645.

In S640, the system determines whether the heat index exceeds the first threshold. If the heat index exceeds the first threshold, then the algorithm 600 advances to S645. If the heat index does not exceed the first threshold, then the algorithm 600 advances to S650.

In S645, the system performs level 1 notifications, discussed in connection with FIG. 9. The algorithm 600 then advances to S650.

In S650, the algorithm 600 concludes.

Algorithms 500 and 600 begin by comparing the heat index against the lowest or highest of four thresholds, respectively. Thus, the system sometimes performs a number of determinations equal to the total number of thresholds (e.g., four).

For example, the algorithm 500 can include four determinations, if the heat index is greater than the fourth threshold. Likewise, the algorithm 600 can include four determinations, if the heat index is less than the first threshold.

Figure 7:
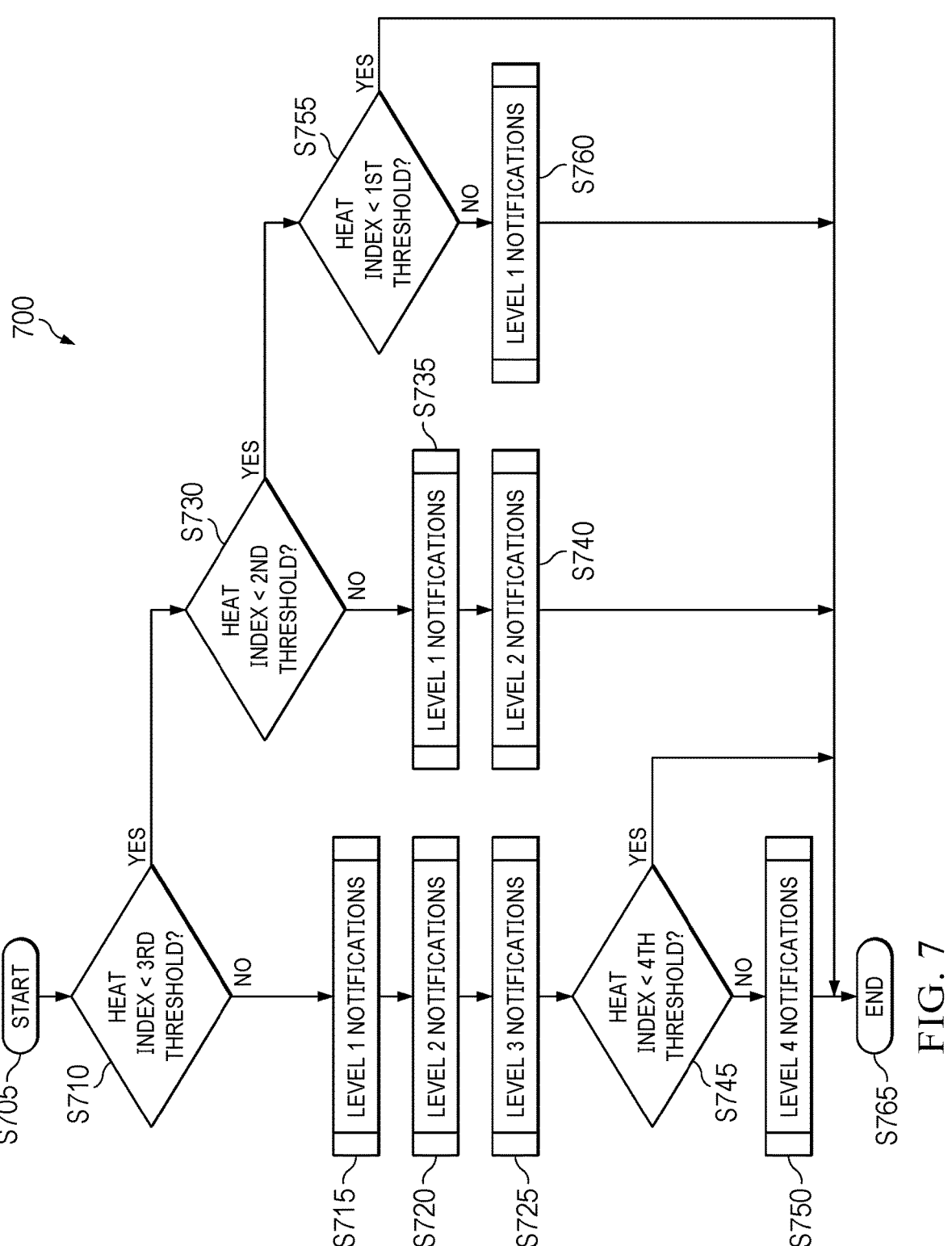
FIG. 7 illustrates a third algorithm for monitoring, for alerting, and responding to a heat risk, according to an implementation of the present disclosure.

FIG. 7 illustrates an algorithm 700 for monitoring, for alerting, and for responding to a heat risk, according to an implementation of the present disclosure. In the algorithm 700, the system initially compares the heat index against the third threshold. Thus, the algorithm 700 can determine an appropriate response in fewer (e.g., no more than three) determinations.

At the beginning of the algorithm 700, the system receives a structural registration including a location and a sensor ID, a personal registration, and a trigger signal, as in S510-S520. The system optionally determines the heat index, as in S525, if the trigger signal did not include the heat index.

The algorithm 700 begins at S705 and advances to S710. In S710, the system compares the heat index to the third threshold. If the system determines the heat index exceeds the third threshold, then the algorithm 700 advances to S715. If the system determines the heat index does not exceed the third threshold, then the algorithm 700 advances to S730.

In S715, the system performs the level 1 notifications discussed in connection with FIG. 9. The algorithm 700 then advances to S720.

In S720, the system performs the level 2 notifications discussed in connection with FIG. 10. The algorithm 700 then advances to S725.

In S725, the system performs the level 3 notifications discussed in connection with FIG. 11. The algorithm 700 then advances to S745.

In S745, the system compares the heat index to the fourth threshold. If the system determines the heat index exceeds the fourth threshold, then the algorithm 700 advances to S750. If the system determines the heat index does not exceed the fourth threshold, then the algorithm 700 advances to S765.

In S750, the system performs the level 4 notifications discussed in connection with FIG. 12. The algorithm then advances to S765.

In S730, the system compares the heat index to the second threshold. If the system determines the heat index exceeds the second threshold, then the algorithm 700 advances to S735. If the system determines the heat index does not exceed the second threshold, then the algorithm 700 advances to S755.

In S735, the system performs the level 1 notifications discussed in connection with FIG. 9. The algorithm 700 then advances to S740.

In S740, the system performs the level 2 notifications discussed in connection with FIG. 10. The algorithm 700 then advances to S765.

In S755, the system compares the heat index to the first threshold. If the system determines the heat index exceeds the first threshold, then the algorithm 700 advances to S760. If the system determines the heat index does not exceed the first threshold, then the algorithm 700 advances to S765.

In S760, the system performs the level 1 notifications discussed in connection with FIG. 9.

In S765, the algorithm 700 concludes.

In the algorithm 700, the level 1 notifications were illustrated as performed before the level 2 notifications and level 3 notifications, if the heat index exceeds the third threshold. In some implementations, the level 3 notifications can be performed before the level 2 notifications, which in turn can be performed before the level 1 notifications.

Similarly, the level 2 notifications can be performed before the level 1 notifications, if the heat index exceeds the second threshold.

In the algorithm 700, the system initially compares the heat index to the third threshold. Thus, the system can determine an appropriate response in no more than three determinations.

Figure 8:
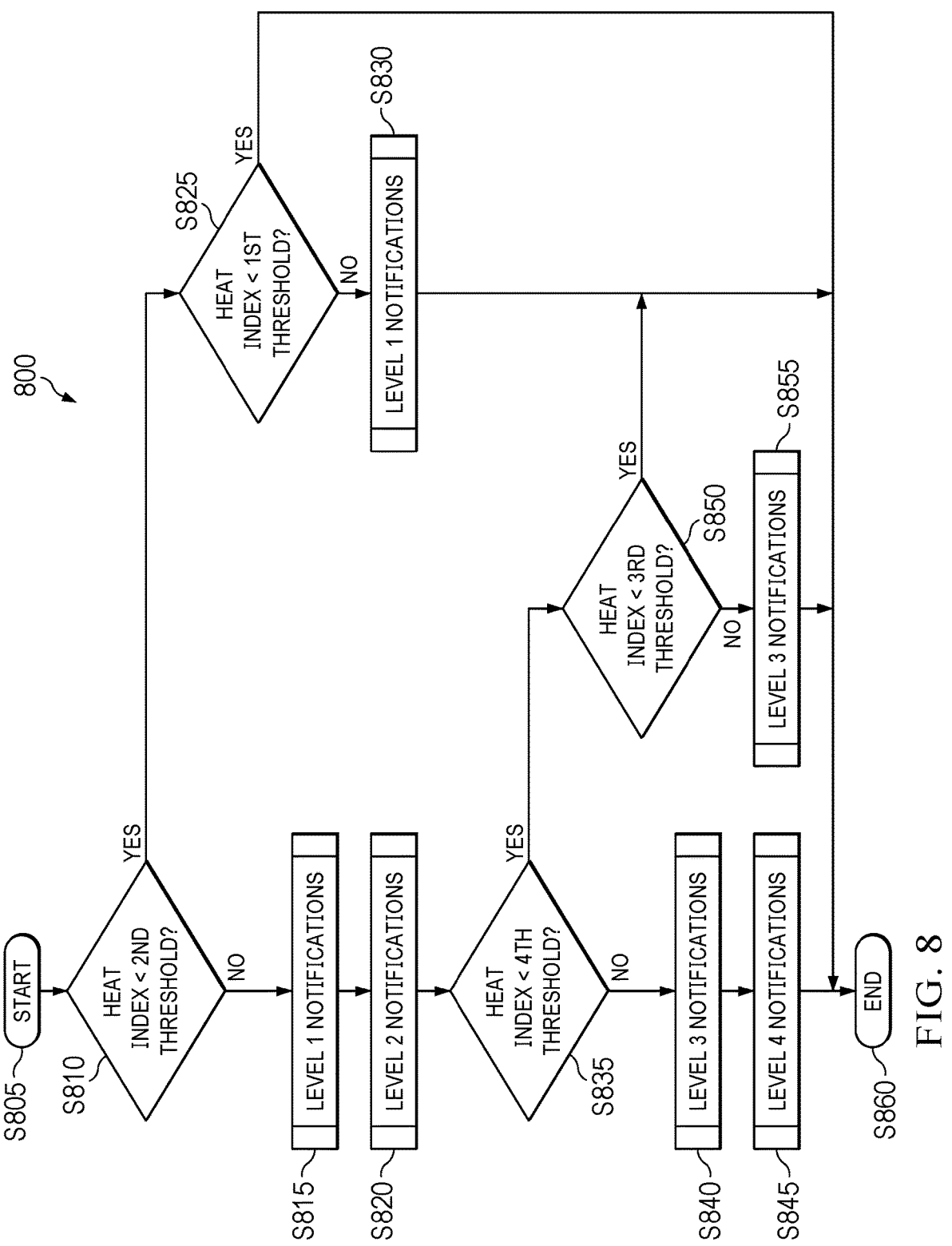
FIG. 8 illustrates a fourth algorithm for monitoring, for alerting, and responding to a heat risk, according to an implementation of the present disclosure.

FIG. 8 illustrates an algorithm 800 for monitoring, for alerting, and for responding to a heat risk, according to an implementation of the present disclosure. In the algorithm 800, the system initially compares the heat index to the second threshold. Because the second threshold is lower than the third threshold, this system is more likely to determine that the heat index exceeds the second threshold than the third threshold. Thus, the system can begin taking action earlier, while also determining an appropriate response in fewer determinations.

At the beginning of the algorithm 800, the system receives a structural registration including a location and a sensor ID, a personal registration, and a trigger signal, as in S510-S520. The system optionally determines the heat index, as in S525, if the trigger signal did not include the heat index.

The algorithm 800 begins at S805 and advances to S810. In S810, the system compares the heat index to the second threshold. If the system determines the heat index exceeds the second threshold, the algorithm 800 advances to S815. If the system determines the heat index does not exceed the second threshold, the algorithm 800 advances to S825.

In S815, the system performs the level 1 notifications discussed in connection with FIG. 9. The algorithm 800 then advances to S820.

In S820, the system performs the level 2 notifications discussed in connection with FIG. 10. The algorithm then advances to S835.

In S835, the system compares the heat index to the fourth threshold. If the system determines the heat index exceeds the fourth threshold, then the algorithm 800 advances to S840. If the system determines the heat index does not exceed the fourth threshold, then the algorithm 800 advances to S850.

In S840, the system performs the level 3 notifications discussed in connection with FIG. 11. The algorithm 800 then advances to S845.

In S845, the system performs the level 4 notifications discussed in connection with FIG. 12. The algorithm then advances to S860.

In S850, the system compares the heat index to the third threshold. If the system determines the heat index exceeds the third threshold, then the algorithm 800 advances to S855. If the system determines the heat index does not exceed the third threshold, then the algorithm 800 advances to S860.

In S855, the system performs the level 3 notifications discussed in connection with FIG. 11. The algorithm 800 then advances to S860.

In S825, the system compares the heat index to the first threshold. If the system determines the heat index exceeds the first threshold, then the algorithm 800 advances to S830. If the system determines the heat index does not exceed the first threshold, then the algorithm 800 advances to S860.

In S830, the system performs the level 1 notifications discussed in connection with FIG. 9. The algorithm 800 then advances to S860.

In S860, the algorithm 800 concludes.

In the algorithm 800, the level 1 notifications were illustrated as performed before the level 2 notifications, if the heat index exceeds the second threshold. Likewise, the level 3 notifications were illustrated as performed before the level 4 notifications, if the heat index exceeds the fourth threshold. In some implementations, the level 2 notifications can be performed before the level 1 notifications, and the level 4 notifications can be performed before the level 3 notifications.

FIGS. 5-8 set forth four different algorithms for monitoring, for alerting, and for responding to a heat risk. Each of these algorithms sets forth a different ordering of the same four threshold determinations. Without limiting the scope of the present innovation to as many as or as few as four such determinations, there are twenty-four such orderings of the four explicitly disclosed determinations and accompanying operations, and any such ordering would immediately come to the mind of one skilled in the art with the benefit of the present disclosure as suitably modified to achieve particular results.

In some implementations, the sensor periodically transmits trigger signals, and in many such implementations, the system can use these trigger signals for monitoring. For example, a sensor can transmit a first trigger signal indicating a then-current first heat index that exceeds the first threshold but does not exceed the second threshold. After a predetermined period (e.g., ten minutes) expires, the sensor transmits a second trigger signal indicating a then-current second heat index that is nearly the same as the first heat index. In particular, the second heat index also exceeds the first threshold but does not exceed the second threshold. In this case, because the system transmitted a level 1 notification in response to the first trigger signal, the system does not necessarily re-transmit a notification of a same type (e.g., a level 1 notification) in response to the second trigger signal.

Almost all implementations reset the monitoring for sending a notification of a same type. For example, the system can reset at a predetermined time of night the determinations that the thresholds have been exceeded. The predetermined time can be midnight or 4 am, for example. The rest can occur every day or at the beginning of every weekday or school day.

Thus, after the predetermined time, the system again can send out a notification of a same type (e.g., a level 1 notification), upon the heat index exceeding a previously exceeded threshold (e.g., the first threshold).

In some implementations, the reset can occur when the heat index drops below an exceeded threshold for a predetermined period of time. In select implementations, the predetermined period of time is the periodicity of the trigger signals (e.g., 10 minutes, when the periodicity of the trigger signals is 10 minutes) or twice the periodicity (e.g., 20 minutes). In other implementations, the predetermined period of time can be longer (e.g., 2 hours).

For example, a first trigger signal might indicate a first heat index that exceeds the first threshold. As discussed above, the system can send out a level 1 notification. A second trigger signal might indicate a second heat index that does not exceed the first threshold. If a third trigger signal then exceeds the first threshold, the system again can send out a level 1 notification.

Of course, other implementations are possible, such as resetting the monitoring, based on a manual (e.g., human input) interface. FIG. 9 illustrates an algorithm 900 for level 1 notifications, according to an implementation of the present disclosure.

The algorithm 900 begins at S920 and advances to S925.

In S925, the system can determine, based on the sensor ID indicated or included in the trigger signal and the building registration, a location in which the heat index exceeded the first threshold. The algorithm 900 then advances to S930.

In S930, the system can determine devices IDs of people with positions of responsibility of physical plant, administrator, teacher, and/or staff, for example. The system can perform this determination based on the personal registrations received in S515, for example. The algorithm 900 then advances to S940.

In S940, the system can perform an informational notification and/or a task notification.

In particular, the system can transmit an informational notification to device IDs of persons with responsibility positions of administrators, teachers, and/or staff. Thus, the informational notification can indicate, for example, the first heat index threshold was exceeded and the location of the sensor in which the first heat index threshold was exceeded, as determined in S925.

Further, the system can transmit the task notification to device IDs of persons with a responsibility position of physical plant. As discussed above, the task notification can indicate a task of ensuring the air-conditioning or fans are operating properly. The task notification alternatively or additionally can indicate a task of opening windows at night and/or using fans to bring in cooler air. In select implementations, the task notification can indicate the location in which the heat index exceeded the first threshold, so that physical plant can identify which windows should be opened and where fans should be used.

The algorithm 900 then advances to S960, in which the algorithm 900 concludes.

FIG. 10 illustrates an algorithm 1000 for level 2 notifications, according to an implementation of the present disclosure.

The algorithm 1000 begins at S1010 and advances to S1020.

In S1020, the system can determine, based on the sensor ID indicated or included in the trigger signal and the building registration, a location in which the heat index exceeded the second threshold. The algorithm 1000 then advances to S1025.

In S1025, the system can determine devices IDs of people with positions of responsibility of physical plant, administrator, and/or teacher, for example. The system can perform this determination based on the personal registrations received in S515, for example. The algorithm 1000 then advances to S1030.

In S1030, the system can perform an informational notification and/or a task notification.

In particular, the system can transmit an informational notification to device IDs of persons with responsibility positions of administrators, teachers, and/or staff. Thus, the informational notification can indicate, for example, the second heat index threshold was exceeded and the location of the sensor in which the second heat index threshold was exceeded, as determined in S1020.

Further, the system can transmit the task notification to device IDs of persons with a responsibility position of administrator, teacher, and/or physical plant. This task notification can indicate the location of the sensor in which the second heat index threshold was exceeded. Further, the task notification to the administrators and physical plant can be performed regardless of the user location identified by their personal registration. As discussed above, the task notification to the administrators or teachers can indicate a task to conduct student lunch under a shade structure (such as a pavilion) or in a classroom/building with limited time given for free outdoor play. The task notification to the physical plant can indicate a task to ensure fans are located and operational in the location of the sensor. The task notification to the device IDs of the physical plant can indicate a task of turning off unnecessary lighting (e.g., hallways, entryways), ensuring doors and windows are closed in air-conditioned rooms, and/or turning on sprinklers near the affected location only for a short period of time. Thus, the system can perform a general notification of a specific location, as described in FIG. 4. The algorithm 1000 then advances to S1040.

In S1040, the system notifies specific-location staff, based on the location of the sensor. For example, the system can determine a user device ID, based on the responsibility position of teacher and a user location of or nearby the location of the sensor. Thus, the system can perform a notification of a task to these teachers to ensure the windows and door are open, to ensure the fan is working to provide a cross-breeze (when the outside air temperature is lower than inside), to close the windows if the outside temperature exceeds the inside temperature, to implement more frequent water breaks, and/or to darken rooms by shutting off overhead lights and closing blinds, if possible. The algorithm 1000 then advances to S1050.

In S1050, the system can notify other specific-location staff of general procedures. For example, the system can transmit a task notification to teachers and staff of other locations to indicate a task of implementing an adapted schedule (e.g., physical education class only in the morning), to ensure a "cool room" is available for use by students showing early signs of heat distress, and/or to give students time and encouragement to hydrate, prior to boarding buses. The algorithm 1000 then advances to S1060.

In S1060, the algorithm 1000 concludes.

Figure 11:
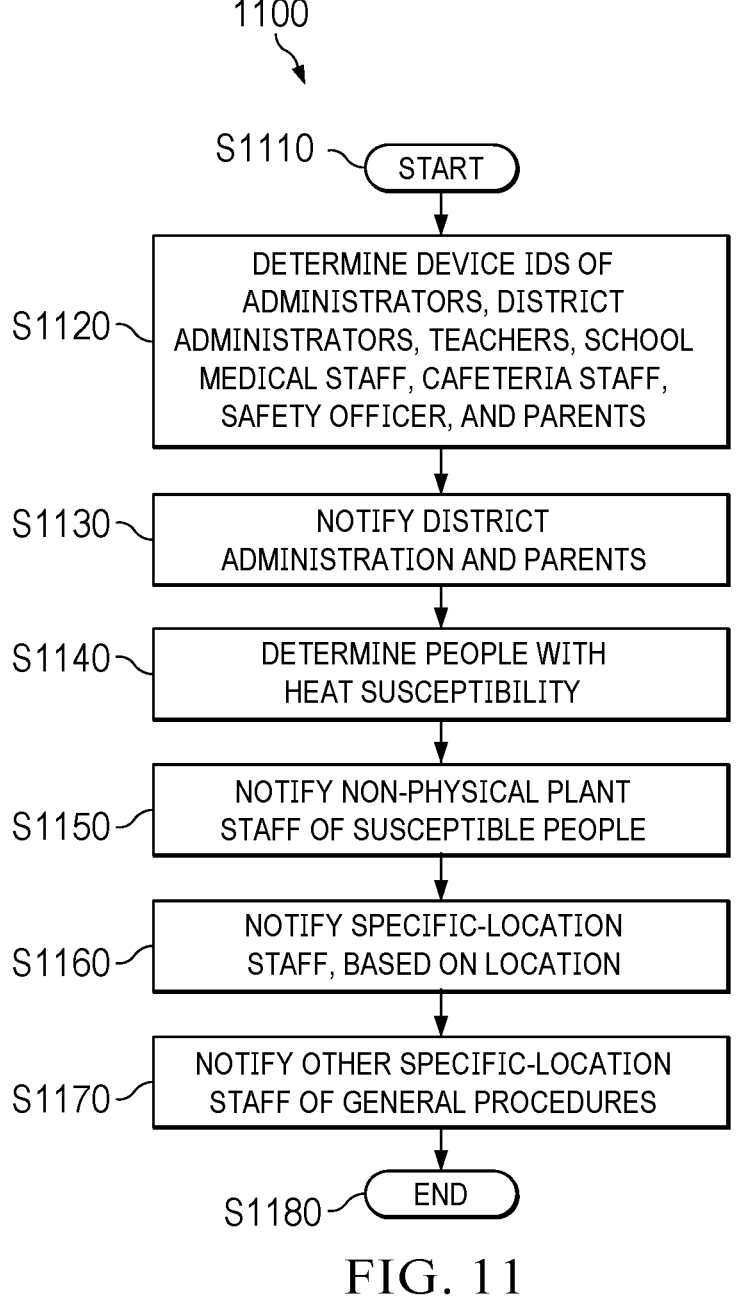
FIG. 11 illustrates an algorithm for level 3 notifications, according to an implementation of the present disclosure.

FIG. 11 illustrates an algorithm 1100 for level 3 notifications, according to an implementation of the present disclosure. The algorithm 1100 begins at S1110 and advances to S1120.

In S1120, the system can determine device IDs, based on responsibility positions of administrators, district administrators, teachers, school medical staff, cafeteria, school safety officer, and parents/guardians. The algorithm 1100 then advances to S1130.

In S1130, the system performs an informational notification, based on device IDs determined in S120. For example, the system can transmit a first informational notification to devices of administrators, affected teachers, and staff that the third heat index threshold was exceeded in the location.

The system alternatively or additionally can perform an informational notification to devices of the district administrators and the parents. In particular, the informational notification can indicate to the device of the district administrators the name of the school and that the third heat index threshold was exceeded in the school. Further, the informational notification additionally or alternatively can indicate to devices of the parents/guardians the name of the school and the possibility of a school closure. The algorithm 1100 then advances to S1140.

In S1140, the system determines user names of staff with heat susceptibility, based on the personal registrations as shown in FIG. 3A.

The system determines user names of students with heat susceptibility, based on the personal registrations as shown in FIG. 3B. Further, in various implementations, the system can determine a teacher and/or medical staff responsible for the student, based on a personal registration illustrated in FIG. 3B. The algorithm then advances to S1150.

In S1150, the system can notify administrators of a task to check on staff members (e.g., user names of personal registrations with heat susceptibility) with health conditions (e.g., heat susceptibility).

In addition or alternatively, the system can perform a task notification to device IDs of the administrators to indicate a task to cancel extra-curricular activities.

Further, the system can determine user names of students with heat susceptibility (e.g. are health-compromised). In some implementations, the system filters the personal registrations based on a responsibility position of student and heat susceptibility (e.g., "yes" in the heat susceptibility field) to determine the user names. The system can then inform the school medical staff of these user names.

In some implementations, the student body is split across designated medical staff. For example, a different medical staff member might be responsible for each student grade level. Alternatively or additionally, a different medical staff member might be responsible for students with last names beginning with different letters of the alphabet. Other divisions of students can be more complex. Thus, some implementations use the data structure illustrated in FIG. 3B, such that the system can determine a medical contact (e.g., school medical staff) responsible for the student.

Thus, the system can send a task notification to school medical staff to perform a periodic check on students with heat susceptibility (e.g., who are health compromised). Alternatively or in addition, the system can send a task notification to the school medical staff to be available in the "cool room," if they are available.

Further, in addition or alternatively, the system can send a task notification to the school medical staff to contact parents/guardians of students with serious health situations to determine if attendance at the school is considered hazardous. In this case, the system can indicate, in this task notification, the name (e.g., user name) of the student in the personal registration, as well as the parental contact indicated in FIG. 3B.

Further, the system can send an informational notification to cafeteria staff to minimize use of heat-generating equipment (e.g., steam tables and ovens). The system can additionally or alternatively transmit a task notification to the cafeteria staff to distribute water bottles and/or large moist towelettes to the location.

The algorithm 1100 then advances to S1160.

In S1160, the system performs a notification to specific-location staff, based on the location. For example, the system determines device IDs, based on responsibility positions of teachers and user locations of (or near) the location of the sensor. The system then can transmit to the device IDs a task notification indicating a task of commencing a predetermined rotation of students to cooler areas of the school, minimizing teaching, and/or otherwise allowing students rest periods. The task notification additionally or alternatively can indicate to turn off or minimize use of electronics, such as computers and smart boards, ensure frequent hydration breaks, and/or escort students showing signs of heat stress to the "cool room."

The algorithm 1100 then advances to S1170.

In S1170, the system performs a notification of other specific-location staff of general procedures. For example, the system can determine device IDs, based on responsibility positions of teachers and user locations not of (or near) the location of the sensor. The system then can transmit to the device IDs a task notification indicating implementing a second adapted schedule. The second adapted schedule can be canceling physical education classes or only holding them indoors in air-conditioned spaces, for example. In addition or alternatively, the system can transmit a task notification to non-classroom staff to indicate a task of performing roaming duties to watch for signs of heat stress or illness in others. The algorithm 100 then advances to S1180.

In S1180, the algorithm 1100 concludes.

Figure 12:
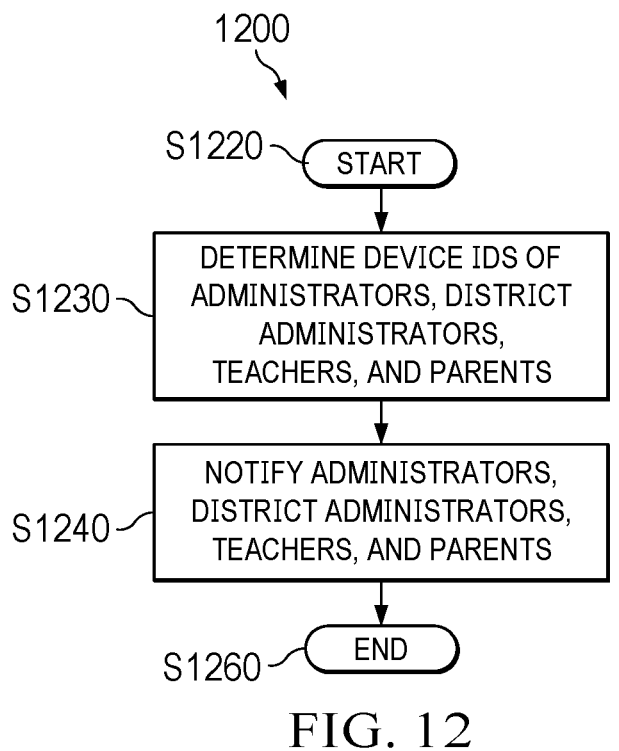
FIG. 12 illustrates an algorithm for level 4 notifications, according to an implementation of the present disclosure.

FIG. 12 illustrates an algorithm 1200 for level 4 notifications, according to an implementation of the present disclosure. The algorithm 1200 commences at S1220 and advances to S1230.

In S1230, the system can determine device IDs of personal registrations with a responsibility position of administrator, district administrator, teacher, and/or parent. The algorithm 1200 then advances to S1240.

In S1240, the system transmits a notification to device IDs of administrators, district administrators, teachers, and/or parents/guardians. For example, the system can transmit an informational notification to administrators, teachers at the location, and staff that indicates the location and that the fourth heat index threshold was exceeded in the location. Further, the system can transmit an informational notification to the device IDs of the district administrators that indicates the name of the school and that the fourth heat index threshold was exceeded in the school. In addition or alternatively, the system can transmit an informational notification to the device IDs of the parents/guardians that indicates that the fourth heat index threshold was exceeded and indicates school closure information.

In addition, the system can transmit a task notification to the device IDs of the administrators. For example, the task notification can indicate a task to execute a school cancellation and/or early release procedure. Additionally or alternatively, the task notification can indicate a task to direct provisioning for transportation of students who are regularly transported in district buses and other students not residing nearby. Further additionally or alternatively, the task notification can indicate a task to provide for notification and status reports to parents/guardians and the public.

In some implementations, the system can determine the administrator based on the data structure illustrated in FIG. 3B. Such an implementation efficiently can divide responsibility for students across multiple administrators. Thus, for each student, the system can determine a responsible administrator and can determine the parent contact that the administrator or the system should contact.

The algorithm 1200 advances to S1260, in which the algorithm 1200 concludes.

The present disclosure primarily focuses on measuring a heat index. Implementations can alternatively or additionally use temperature (only), humidity (only), wet bulb globe temperature, or Robert Steadman's "sultriness" measurement. The first through fourth thresholds can be modified appropriately to reflect the differences between the heat index discussed in the present disclosure and these alternative measurements, although it is not feasible to directly convert the thresholds.

Figure 13:
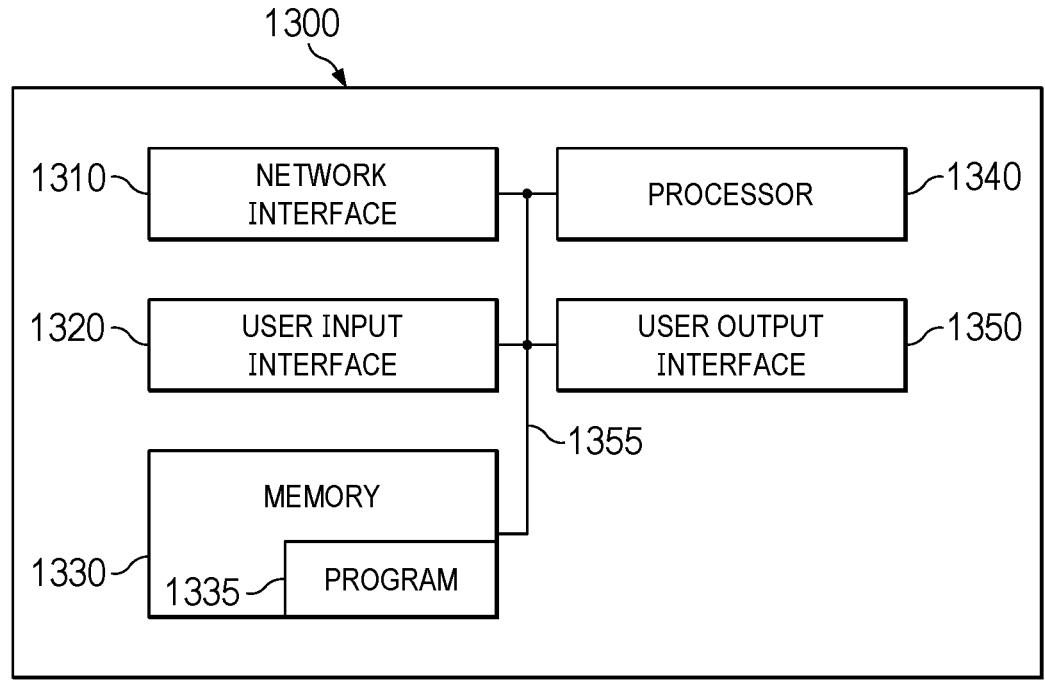
FIG. 13 illustrates a computing device, according to an implementation of the present disclosure.

FIG. 13 illustrates a computing device 1300, according to an implementation of the present disclosure. The plurality of sensors 205, the plurality of radio repeaters 210, the base station 215, the server 220, the front end UI 225, the smartphone 240, and/or the desktop computer 245 can be implemented by the computing device 1300.

The computing device 1300 can include a network interface 1310, a user input interface 1320, a memory 1330, a program 1335, a processor 1340, a user output interface 1350, and a bus 1355.

Although illustrated within a single housing, the computing device 1300 can be distributed across plural housings or sub-systems that cooperate in executing program instructions. In some implementations, the computing device 1300 can include one or more blade server devices, standalone server devices, personal computers (including laptop computers and tablet computers), routers, hubs, switches, bridges, firewall devices, intrusion detection devices, mainframe computers, network-attached storage devices, smartphones and other mobile telephones, and other computing devices. Although the system executes the Windows OS, macOS, Linux, or Android in many implementations, the system hardware can be configured according to a Symmetric Multi-Processing (SMP) architecture or a Non-Uniform Memory Access (NUMA) architecture.

The network interface 1310 provides one or more communication connections and/or one or more devices that allow for communication between the computing device 1300 and other computing systems (not shown) over a communication network, collection of networks (not shown), or the air, to support the operations for monitoring for and alerting on risk of heat stress, outlined herein. The network interface 1310 can communicate using various networks (including both internal and external networks) such as near-field communications (NFC), Wi-Fi™, Bluetooth, Ethernet, cellular (e.g., 3G, 4G, 5G), white space, 802.11x, satellite, Bluetooth, LTE, GSM/HSPA, CDMA/EVDO, DSRC, CAN, GPS, facsimile, or any other wired or wireless interface. Other interfaces can include physical ports (e.g., Ethernet, USB, HDMI, etc.), interfaces for wired and wireless internal subsystems, and the like. Similarly, nodes and user equipment (e.g., mobile devices) of the system can also include suitable interfaces for receiving, transmitting, and/or otherwise communicating data or information in a network environment.

The user input interface 1320 can receive one or more inputs from a human. The user input interface 1320 can be or include a mouse, a touchpad, a keyboard, a touchscreen, a trackball, a camera, a microphone, a joystick, a game controller, a scanner, or any other input device.

The memory 1330, also termed a "storage," can include or be one or more computer-readable storage media readable by the processor 1340 and that store software. The memory 1330 can be implemented as one storage device or across multiple co-located or distributed storage devices or sub-systems. The memory 1330 can include additional elements, such as a controller, that communicate with the processor 1340. The memory 1330 can also include storage devices and/or sub-systems on which data and/or instructions are stored. The computing device 1300 can access one or more storage resources to access information to carry out any of the processes indicated in this disclosure and, in particular, FIGS. 5-12. In various implementations, the memory 1330 stores the program 1335 to execute at least a portion of the algorithms illustrated in FIGS. 5-12. Further, the program 1335, when executed by the computing device 1300 generally and/or the processor 1340 specifically, can direct, among other functions, performance of the operations of monitoring for and alerting on risk of heat stress, as described herein.

The memory 1330 can be or include a read-only memory (ROM), a programmable ROM (PROM), an erasable PROM (EPROM), an electrically erasable PROM (EEPROM), a random-access memory (RAM), a dynamic RAM (DRAM), a static RAM (SRAM), a field programmable gate array (FPGA), a hard drive, a cache memory, a flash memory, a removable disk, or a tape reel. The memory 1330 can be or include resistive RAM (RRAM) or a magneto-resistive RAM (MRAM). The information being tracked, sent, received, or stored in the communication system can be provided in any database, register, table, cache, queue, control list, or storage structure, based on particular implementations, all of which could be referenced in any suitable timeframe.

The processor 1340 (e.g., a processing unit) can be or include one or more hardware processors and/or other circuitry that retrieve and execute software, especially the program 1335, from the memory 1330. The processor 1340 can be implemented within one processing device, chip, or package and can also be distributed across multiple processing devices, chips, packages, or sub-systems that cooperate. In some implementations, the processor 1340 is or includes a Graphics Processing Unit (GPU).

The processor 1340 can have any register size, such as a 32-bit register or a 64-bit register, among others. The processor 1340 can include multiple cores. Implementations of the processor 1340 are not limited to any particular number of threads. The processor 1340 can be fabricated by any process technology, such as 14 nm process technology.

The user output interface 1350 outputs information to a human user. The user output interface 1350 can be or include a display (e.g., a screen), a touchscreen, speakers, a printer, or a haptic feedback unit. In many implementations, the user output interface 1350 can be combined with the user input interface 1320. For example, some such implementations include a touchscreen, a headset including headphones and a microphone, or a joystick with haptic feedback.

In implementations including multiple computing devices, a server of the system or, in a serverless implementation, a peer can use one or more communications networks that facilitate communication among the computing devices to achieve the operations for monitoring for and alerting on risk of heat stress, as outlined herein. For example, the one or more communications networks can include or be a local area network (LAN), wide area network (WAN), or a metropolitan area network (MAN) that facilitate communication among the computing devices. One or more direct communication links can be included between the computing devices. In addition, in some cases, the computing devices can be installed at geographically distributed locations. In other cases, the multiple computing devices can be installed at one geographic location, such as a server farm or an office.

As used herein, the terms "storage media" or "computer-readable storage media" can refer to non-transitory storage media, such as non-limiting examples of a hard drive, a memory chip, an ASIC, and cache memory, and to transitory storage media, such as carrier waves or propagating signals.

Aspects of the system can be implemented in various manners, e.g., as a method, a system, a computer program product, or one or more computer-readable storage media. Accordingly, aspects of the present disclosure can take the form of a hardware implementation, a software implementation (including firmware, resident software, or microcode) or an implementation combining software and hardware aspects that can generally be referred to herein as a "module" or a "system." Functions described in this disclosure can be implemented as an algorithm executed by one or more hardware processing units, e.g., the processor 1340. In various embodiments, different operations and portions of the operations of the algorithms described can be performed by different processing units. In some implementations, the operations can be achieved by reciprocating software in any of the plurality of sensors 205, the plurality of radio repeaters 210, the base station 215, the server 220, the front end UI 225, the smartphone 240, and/or the desktop computer 245. Furthermore, aspects of the present disclosure can take the form of a computer program product embodied in one or more computer-readable media having computer-readable program code embodied, e.g., encoded or stored, thereon. In various implementations, such a computer program can, for example, be downloaded (or updated) to existing devices and systems or be stored upon manufacture of these devices and systems.

Any suitable permutation can be applied to a physical implementation, including the design of the communications network in which the system is implemented. In one embodiment, the bus 1355 can share hardware resources with the memory 1330 and the processor 1340. In this alternative implementation, the computing device 1300 be provided with separate hardware resources including one or more processors and memory elements.

In example implementations, various other components of the computing device 1300 can be installed in different physical areas or can be installed as single units.

The communication system can be configured to facilitate communication with machine devices (e.g., infrastructure sensors, instruments, electronic control units (ECUs), embedded devices, actuators, displays, etc.) through the bus 1355. Other suitable communication interfaces can also be provided for an Internet Protocol (IP) network, a user datagram protocol (UDP) network, or any other suitable protocol or communication architecture enabling network communication with machine devices.

The innovations in this detailed description can be implemented in a multitude of different ways, for example, as defined and covered by the claims and/or select examples. In the description, reference is made to the drawings where like reference numerals can indicate identical or functionally similar elements. Elements illustrated in the drawings are not necessarily drawn to scale. Additionally, certain implementations can include more elements than illustrated in a drawing and/or a subset of the elements illustrated in a drawing. Further, some implementations can incorporate a suitable combination of features from two or more drawings.

The disclosure describes various illustrative implementations and examples for implementing the features and functionality of the present disclosure. The components, arrangements, and/or features are described in connection with various implementations and are merely examples to simplify the present disclosure and are not intended to be limiting. In the development of actual implementations, implementation-specific decisions can be made to achieve specific goals, including compliance with system, business, and/or legal constraints, which can vary from one implementation to another. Additionally, while such a development effort might be complex and time-consuming, it would be a routine undertaking for those of ordinary skill in the art having the benefit of this disclosure.

The systems, methods and devices of this disclosure have several innovative aspects, no one of which is solely responsible for the attributes disclosed herein. Some objects or advantages might not be achieved by implementations described herein. Thus, for example, certain implementations can operate in a manner that achieves or optimizes one advantage or group of advantages as taught herein and not other objects or advantages as taught or suggested herein.

In one example implementation, electrical circuits of the drawings can be implemented on a board of an associated electronic device. The board can be a general circuit board that can hold various components of the internal electronic system of the electronic device and, further, provide connectors for other peripherals. More specifically, the board can provide the electrical connections by which other components of the system can communicate electrically. Any processors (inclusive of digital signal processors, microprocessors, supporting chipsets, etc.) and computer-readable, non-transitory memory elements can be coupled to the board based on configurations, processing demands, and computer designs. Other components such as external storage, additional sensors, controllers for audio/video display, and peripheral devices can be attached to the board as plug-in cards, via cables, or integrated into the board itself. In various implementations, the functionalities described herein can be implemented in emulation form as software or firmware running within one or more configurable (e.g., programmable) elements arranged in a structure that supports these functions. A non-transitory, computer-readable storage medium can include instructions to allow one or more processors to retrieve the instructions to carry out the emulation.

In another example implementation, the electrical circuits of the drawings can be implemented as stand-alone modules (e.g., a device with associated components and circuitry configured to perform a specific application or function) or implemented as plug-in modules into application specific hardware of electronic devices. Implementations of the present disclosure can be readily included in a system-on-chip (SOC) package. An SOC represents an integrated circuit (IC) that integrates components of a computer or other electronic system into one chip. The SOC can contain digital, analog, mixed-signal, and often radio frequency functions on one chip substrate. Other implementations can include a multi-chip-module (MCM), with a plurality of separate ICs located within one electronic package and that interact through the electronic package. In various other implementations, the processors can be implemented in one or more silicon cores in Application Specific Integrated Circuits (ASICs), Field Programmable Gate Arrays (FPGAs), programmable array logic (PAL), generic array logic (GAL), and other semiconductor chips.

The specifications, dimensions, and relationships outlined herein (e.g., the number of processors and logic operations) have been offered for non-limiting purposes of example and teaching. For example, various modifications and changes can be made to the arrangements of components. The description and drawings are, accordingly, to be regarded in an illustrative sense, not in a restrictive sense.

The numerous examples provided herein described interaction in terms of two, three, or more electrical components for purposes of clarity and example. The system can be consolidated in any manner. Along similar design alternatives, the illustrated components, modules, and elements of the drawings can be combined in various possible configurations within the scope of this disclosure. In certain cases, one or more of the functionalities of a given set of flows might be more clearly described by referencing a limited number of electrical elements. The electrical circuits of the drawings are readily scalable and can accommodate many components, as well as more complicated/sophisticated arrangements and configurations. Accordingly, the provided examples do not limit the scope or inhibit the teachings of the electrical circuits as potentially applied to a myriad of other architectures.

In this disclosure, references to various features (e.g., elements, structures, modules, components, steps, operations, characteristics, etc.) included in "one implementation," "example implementation," "an implementation," "another implementation," "some implementations," "various implementations," "other implementations," "alternative implementation," and the like are intended to mean that any such features can be included in one or more implementations of the present disclosure and might or might not necessarily be combined in the same implementations. Some operations can be deleted or omitted where appropriate, or these operations can be modified or changed considerably. In addition, the timing of these operations can be altered considerably. The preceding operational flows have been offered for purposes of example and discussion. Implementations described herein provide flexibility in that any suitable arrangements, chronologies, configurations, and timing mechanisms can be provided.

EXAMPLES

In Example M1, a method includes receiving a first personal registration indicating a first responsibility position of a first person, the first personal registration further indicating a first device ID; receiving a first trigger signal including first heat data identifying a first heat index; determining that the first heat index exceeds a first predetermined threshold; determining the first device ID, at least in part based on the first responsibility position; and performing a first notification, at least in part based on the first device ID.

Example M2 is the method of Example M1, further comprising: receiving a structural registration identifying a location and a first sensor ID; and determining the location, at least in part based on the first sensor ID, wherein the first sensor ID is indicated by the first trigger signal, the first personal registration indicates the location, and the first notification indicates the location.

Example M3 is the method of Example M2, wherein the first device ID is determined at least in part based on the location.

Example M4 is the method of any of Examples M1-M3, further comprising: receiving a second personal registration indicating a user name and a heat susceptibility; and determining the user name, at least in part based on the heat susceptibility, wherein the first notification indicates the user name.

Example M5 is the method of Example M4, further comprising: determining a contact, at least in part based on the heat susceptibility, wherein the second personal registration indicates the contact; and performing a second notification to the contact, wherein the second notification indicates the user name.

Example M6 is the method of any of Examples M1-M5, further comprising: receiving a second personal registration indicating a second responsibility position of a second person, the second personal registration further indicating a second device ID, the second responsibility position different from the first responsibility position; receiving a second trigger signal including second heat data identifying a second heat index; determining that the second heat index exceeds a second predetermined threshold greater than the first predetermined threshold; determining the second device ID, at least in part based on the second responsibility position; and performing a third notification, at least in part based on the second device ID.

Example M7 is the method of any of Examples M1-M6, wherein the first heat index is calculated based on $HI=c_1+c_2T+c_3R+c_4TR+c_5T^2+c_6R^2+c_7T^2R+c_8TR^2+c_9T^2R^2$, where HI=Heat Index in degrees Fahrenheit (° F.), R=Relative Humidity in % between 0 and 100, and T=Temperature in degrees Fahrenheit, c1 is substantially equal to −42.4, c2 is substantially equal to 2.05, c3 is substantially equal to 10.1, c4 is substantially equal to −0.225, c5 is substantially equal to −6.84×10$^{-3}$, c6 is substantially equal to −5.48×10$^{-2}$, c7 is substantially equal to 1.23×10$^{-3}$, c8 is substantially equal to 8.53×10$^{-4}$, and c9 is substantially equal to −1.99×10$^{-6}$.

In Example A1, an apparatus includes a network interface that receives a first personal registration and a first trigger signal, the first trigger signal including first heat data identifying a first heat index, the first personal registration indicating a first responsibility position of a first person and a first device ID; and a processor configured to determine that the first heat index exceeds a first predetermined threshold, the processor further configured to determine the first device ID, at least in part based on the first responsibility position, wherein a first notification is performed, at least in part based on the first device ID.

Example A2 is the apparatus of Example A1, wherein the network interface receives a structural registration identifying a location and a first sensor ID, the first sensor ID included in the first trigger signal, the processor further is configured to determine the location, at least in part based on the first sensor ID, the first personal registration indicates the location.

Example A3 is the apparatus of Example A2, wherein the processor further is configured to determine the first device ID at least in part based on the location.

Example A4 is the apparatus of any of Examples A1-A3, wherein the network interface receives a second personal registration indicating a user name and a heat susceptibility, the processor further is configured to determine the user name, at least in part based on the heat susceptibility, and the first notification indicates the user name.

Example A5 is the apparatus of Example A4, wherein the processor further is configured to determine a contact, at least in part based on the heat susceptibility, the second personal registration indicating the contact, and a second notification is performed to the contact, the second notification indicating the user name.

Example A6 is the apparatus of any of Examples A1-A5, wherein the network interface receives a second personal registration indicating a second responsibility position of a second person, the second personal registration further indicating a second device ID, the second responsibility position different from the first responsibility position, the network interface further receives a second trigger signal including second heat data identifying a second heat index, the processor further configured to determine that the second heat index exceeds a second predetermined threshold greater than the first predetermined threshold, the processor further configured to determine the second device ID, at least in part based on the second responsibility position, and a third notification is performed, at least in part based on the second device ID.

Example A7 is the apparatus of any of Examples A1-A6, wherein the first heat index is calculated based on HI=$c_1$+ $c_2$T+$c_3$R+$c_4$TR+$c_5$T$^2$+$c_6$R$^2$+$c_7$T$^2$R+$c_8$TR$^2$+$c_9$T$^2$R$^2$, where HI=Heat Index in degrees Fahrenheit (° F.), R=Relative Humidity in % between 0 and 100, and T=Temperature in degrees Fahrenheit, c1 is substantially equal to −42.4, c2 is substantially equal to 2.05, c3 is substantially equal to 10.1, c4 is substantially equal to −0.225, c5 is substantially equal to −6.84×10$^{-3}$, c6 is substantially equal to −5.48×10$^{-2}$, c7 is substantially equal to 1.23×10$^{-3}$, c8 is substantially equal to 8.53×10$^{-4}$, and c9 is substantially equal to −1.99×10$^{-6}$.

In Example C1, a computer-readable medium includes instructions that, when executed by a processor, perform operations comprising: receiving a first personal registration indicating a first responsibility position of a first person, the first personal registration further indicating a first device ID; receiving a first trigger signal including first heat data identifying a first heat index; determining that the first heat index exceeds a first predetermined threshold; determining the first device ID, at least in part based on the first responsibility position; and performing a first notification, at least in part based on the first device ID.

Example C2 is the medium of Example C1, the operations further comprising: receiving a structural registration identifying a location and a first sensor ID; and determining the location, at least in part based on the first sensor ID, wherein the first sensor ID is included in the first trigger signal, and the first personal registration indicates the location.

Example C3 is the medium of Example C2, wherein the first device ID is determined at least in part based on the location.

Example C4 is the medium of any of Examples C1-C3, the operations further comprising: receiving a second personal registration indicating a user name and a heat susceptibility; and determining the user name, at least in part based on the heat susceptibility, wherein the first notification indicates the user name.

Example C5 is the medium of Example C4, the operations further comprising: determining a contact, at least in part based on the heat susceptibility, wherein the second personal registration indicates the contact; and performing a second notification to the contact, wherein the second notification indicates the user name.

Example C6 is the medium of any of Examples C1-C5, the operations further comprising: receiving a second personal registration indicating a second responsibility position of a second person, the second personal registration further indicating a second device ID, the second responsibility position different from the first responsibility position; receiving a second trigger signal including second heat data identifying a second heat index; determining that the second heat index exceeds a second predetermined threshold greater than the first predetermined threshold; determining the second device ID, at least in part based on the second responsibility position; and performing a third notification, at least in part based on the second device ID.

Example C7 is the medium of any of Examples C1-C6, wherein the first heat index is calculated based on HI=$c_1$+ $c_2$T+$c_3$R+$c_4$TR+$c_5$T$^2$+$c_6$R$^2$+$c_7$T$^2$R+$c_8$TR$^2$+$c_9$T$^2$R$^2$, where HI=Heat Index in degrees Fahrenheit (° F.), R=Relative Humidity in % between 0 and 100, and T=Temperature in degrees Fahrenheit, c1 is substantially equal to −42.4, c2 is substantially equal to 2.05, c3 is substantially equal to 10.1, c4 is substantially equal to −0.225, c is substantially equal to −6.84×10$^{-3}$, c6 is substantially equal to −5.48×10$^{-2}$, c7 is substantially equal to 1.23×10$^{-3}$, c8 is substantially equal to 8.53×10$^{-4}$, and c9 is substantially equal to −1.99×10$^{-6}$.

In Example F1, an apparatus includes reception means for receiving a first personal registration indicating a first responsibility position of a first person and for receiving a first trigger signal including first heat data identifying a first heat index, the first personal registration further indicating a first device ID; and determination means for determining that the first heat index exceeds a first predetermined threshold and for determining the first device ID, at least in part based on the first responsibility position, wherein a first notification is performed, at least in part based on the first device ID.

Example F2 is the apparatus of Example F1, wherein the reception means receives a structural registration identifying a location and a first sensor ID, the determination means determines the location, at least in part based on the first sensor ID, the first sensor ID is indicated by the first trigger signal, the first personal registration indicates the location, and the first notification indicates the location.

Example F3 is the apparatus of Example F2, wherein the first device ID is determined at least in part based on the location.

Example F4 is the apparatus of any of Examples F1-F3, wherein the reception means receives a second personal registration indicating a user name and a heat susceptibility, the determination means determines the user name, at least in part based on the heat susceptibility, and the first notification indicates the user name.

Example F5 is the apparatus of Example F4, wherein the determination means determines a contact, at least in part based on the heat susceptibility, the second personal registration indicates the contact, a second notification is performed to the contact, and the second notification indicates the user name.

Example F6 is the apparatus of any of Examples F1-F5, wherein the reception means receives a second personal registration indicating a second responsibility position of a second person, the second personal registration further indicating a second device ID, the second responsibility position different from the first responsibility position, the reception means receives a second trigger signal including second heat data identifying a second heat index, the determination means determines that the second heat index exceeds a second predetermined threshold greater than the first predetermined threshold and determines the second device ID, at least in part based on the second responsibility position, and a third notification is performed, at least in part based on the second device ID.

Example F7 is the apparatus of any of Examples F1-F6, wherein the first heat index is calculated based on HI=c$_1$+c$_2$T+c$_3$R+c$_4$TR+c$_5$T$^2$+c$_6$R$^2$+c$_7$T$^2$R+c$_8$TR$^2$+c$_9$T$^2$R$^2$, where HI=Heat Index in degrees Fahrenheit (° F.), R=Relative Humidity in % between 0 and 100, and T=Temperature in degrees Fahrenheit, c1 is substantially equal to −42.4, c2 is substantially equal to 2.05, c3 is substantially equal to 10.1, c4 is substantially equal to −0.225, c5 is substantially equal to −6.84×10$^{-3}$, c6 is substantially equal to −5.48×10$^{-2}$, c7 is substantially equal to 1.23×10$^{-3}$, c8 is substantially equal to 8.53×10$^{-4}$, and c9 is substantially equal to −1.99×10$^{-6}$.

I claim:

1. A method, comprising:

receiving a first personal registration indicating a first responsibility position of a first person, the first personal registration further indicating a first device ID;

receiving a second personal registration indicating a user name and a heat susceptibility;

receiving a first trigger signal including first heat data identifying a first heat index;

determining that the first heat index exceeds a first predetermined threshold;

determining the user name, at least in part based on the heat susceptibility;

determining the first device ID, at least in part based on the first responsibility position; and performing a first notification, at least in part based on the first device ID, wherein the first notification indicates the user name.

2. The method of claim 1, further comprising:

receiving a structural registration identifying a location and a first sensor ID; and determining the location, at least in part based on the first sensor ID, wherein the first sensor ID is indicated by the first trigger signal, the first personal registration indicates the location, and the first notification indicates the location.

3. The method of claim 2, wherein the first device ID is determined at least in part based on the location.

4. The method of claim 1, further comprising:

determining a contact, at least in part based on the heat susceptibility, wherein the second personal registration indicates the contact; and performing a second notification to the contact, wherein the second notification indicates the user name.

5. The method of claim 1, further comprising:

receiving a second personal registration indicating a second responsibility position of a second person, the second personal registration further indicating a second device ID, the second responsibility position different from the first responsibility position;

receiving a second trigger signal including second heat data identifying a second heat index;

determining that the second heat index exceeds a second predetermined threshold greater than the first predetermined threshold;

determining the second device ID, at least in part based on the second responsibility position; and performing a third notification, at least in part based on the second device ID.

6. The method of claim 1, wherein the first heat index is calculated based on $$HI = c_1 + c_2T + c_3R + c_4TR + c_5T^2 + C_6R^2 + c_7T^2R + c_8TR^2 + c_9T^2R^2,$$

where HI=Heat Index in degrees Fahrenheit (° F.), R=Relative Humidity in % between 0 and 100, and T=Temperature in degrees Fahrenheit, c1 is substantially equal to −42.4, c2 is substantially equal to 2.05, c3 is substantially equal to 10.1, c4 is substantially equal to −0.225, c5 is substantially equal to −6.84×10$^{-3}$, c6 is substantially equal to −5.48×10$^{-2}$, c7 is substantially equal to 1.23×10$^{-3}$, c8 is substantially equal to 8.53×10$^{-4}$, and c9 is substantially equal to −1.99×10$^{-6}$.

7. An apparatus, comprising:

a network interface that receives a first personal registration, a second personal registration, and a first trigger signal, the first trigger signal including first heat data identifying a first heat index, the second personal registration indicating a user name and a heat susceptibility, the first personal registration indicating a first responsibility position of a first person and a first device ID; and a processor configured to determine that the first heat index exceeds a first predetermined threshold, the processor further configured to determine the user name, at least in part based on the heat susceptibility, the processor further configured to determine the first device ID, at least in part based on the first responsibility position, wherein a first notification is performed, at least in part based on the first device ID, the first notification indicating the user name.

8. The apparatus of claim 7, wherein the network interface receives a structural registration identifying a location and a first sensor ID, the first sensor ID included in the first trigger signal, and the processor further is configured to determine the location, at least in part based on the first sensor ID, the first personal registration indicates the location.

9. The apparatus of claim 8, wherein the processor further is configured to determine the first device ID at least in part based on the location.

10. The apparatus of claim 7, wherein the processor further is configured to determine a contact, at least in part based on the heat susceptibility, the second personal registration indicating the contact, and a second notification is performed to the contact, the second notification indicating the user name.

11. The apparatus of claim 7, wherein the network interface receives a second personal registration indicating a second responsibility position of a second person, the second personal registration further indicating a second device ID, the second responsibility position different from the first responsibility position, the network interface further receives a second trigger signal including second heat data identifying a second heat index, the processor further configured to determine that the second heat index exceeds a second predetermined threshold greater than the first predetermined threshold, the processor further configured to determine the second device ID, at least in part based on the second responsibility position, and a third notification is performed, at least in part based on the second device ID.

12. A non-transitory, computer-readable medium including instructions that, when executed by a processor, perform operations comprising:

receiving a first personal registration indicating a first responsibility position of a first person, the first personal registration further indicating a first device ID;

receiving a second personal registration indicating a user name and a heat susceptibility;

receiving a first trigger signal including first heat data identifying a first heat index;

determining that the first heat index exceeds a first predetermined threshold;

determining the user name, at least in part based on the heat susceptibility;

determining the first device ID, at least in part based on the first responsibility position; and performing a first notification, at least in part based on the first device ID, wherein the first notification indicates the user name.

13. The medium of claim 12, the operations further comprising:

receiving a structural registration identifying a location and a first sensor ID; and determining the location, at least in part based on the first sensor ID, wherein the first sensor ID is included in the first trigger signal, and the first personal registration indicates the location.

14. The medium of claim 13, wherein the first device ID is determined at least in part based on the location.

15. The medium of claim 12, the operations further comprising:

determining a contact, at least in part based on the heat susceptibility, wherein the second personal registration indicates the contact; and performing a second notification to the contact, wherein the second notification indicates the user name.

16. The medium of claim 12, the operations further comprising:

receiving a second personal registration indicating a second responsibility position of a second person, the second personal registration further indicating a second device ID, the second responsibility position different from the first responsibility position;

receiving a second trigger signal including second heat data identifying a second heat index;

determining that the second heat index exceeds a second predetermined threshold greater than the first predetermined threshold;

determining the second device ID, at least in part based on the second responsibility position; and performing a third notification, at least in part based on the second device ID.

17. The medium of claim 12, wherein the first heat index is calculated based on $$HI = c_1 + c_2 T + c_3 R + c_4 TR + c_5 T^2 + C_6 R^2 + c_7 T^2 R + c_8 TR^2 + c_9 T^2 R^2,$$

where HI=Heat Index in degrees Fahrenheit (° F.), R=Relative Humidity in % between 0 and 100, and T=Temperature in degrees Fahrenheit, c1 is substantially equal to −42.4, c2 is substantially equal to 2.05, c3 is substantially equal to 10.1, c4 is substantially equal to −0.225, c5 is substantially equal to −6.84×10⁻3, c6 is substantially equal to −5.48×10⁻², c7 is substantially equal to 1.23×10⁻³, c8 is substantially equal to 8.53×10⁻⁴, and c9 is substantially equal to −1.99× 10⁻⁶.

\*    \*    \*    \*    \*